US012760133B2

(12) United States Patent
Scheuble et al.

(10) Patent No.: US 12,760,133 B2
(45) Date of Patent: Oct. 13, 2026

(54) AQUEOUS POLYMER LATEX

(71) Applicant: BASF SE, Ludwigshafen am Rhein (DE)

(72) Inventors: Martin Robert Scheuble, Ludwigshafen am Rhein (DE); Ivan Cabrera, Ludwigshafen am Rhein (DE); Joerg Alexander Dimmer, Ludwigshafen am Rhein (DE); Immanuel Willerich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 581 days.

(21) Appl. No.: 18/274,038

(22) PCT Filed: Jan. 26, 2022

(86) PCT No.: PCT/EP2022/051747

§ 371 (c)(1),
(2) Date: Jul. 25, 2023

(87) PCT Pub. No.: WO2022/161998

PCT Pub. Date: Aug. 4, 2022

(65) Prior Publication Data

US 2024/0425628 A1 Dec. 26, 2024

(30) Foreign Application Priority Data

Jan. 26, 2021 (EP) .................................... 21153443

(51) Int. Cl.

| | |
|---|---|
| ***C08F 212/08*** | (2006.01) |
| ***C08F 2/26*** | (2006.01) |
| ***C08K 3/34*** | (2006.01) |
| ***C09D 7/61*** | (2018.01) |
| ***C09D 125/14*** | (2006.01) |
| *C08K 3/22* | (2006.01) |
| *C08K 3/26* | (2006.01) |

(52) U.S. Cl.

CPC .............. *C08F 212/08* (2013.01); *C08F 2/26* (2013.01); *C08K 3/346* (2013.01); *C09D 7/61* (2018.01); *C09D 125/14* (2013.01); *C08K 2003/2241* (2013.01); *C08K 2003/265* (2013.01); *C08K 2201/005* (2013.01)

(58) Field of Classification Search

CPC .............. C08F 212/08; C08F 220/1804; C08F 220/1808; C08F 230/02; C08F 230/085

See application file for complete search history.

(56) References Cited

U.S. PATENT DOCUMENTS

| | | | |
|---|---|---|---|
| 4,079,028 | A | 3/1978 | Emmons et al. |
| 4,155,892 | A | 5/1979 | Emmons et al. |
| 4,269,749 | A | 5/1981 | Marriott et al. |
| 4,654,397 | A | 3/1987 | Mueller-Mall et al. |
| 4,931,494 | A | 6/1990 | Auchter et al. |
| 4,977,219 | A | 12/1990 | Watson, Jr. |
| 5,047,588 | A | 9/1991 | Taylor |
| 5,117,059 | A | 5/1992 | Tylor |
| 5,300,602 | A | 4/1994 | Arita et al. |

(Continued)

FOREIGN PATENT DOCUMENTS

| | | | |
|---|---|---|---|
| DE | 4003422 | A1 | 8/1991 |
| DE | 4137247 | A1 | 5/1993 |
| DE | 19624299 | A1 | 1/1997 |
| DE | 19621027 | A1 | 11/1997 |
| DE | 19741184 | A1 | 3/1999 |
| DE | 19741187 | A1 | 3/1999 |

(Continued)

OTHER PUBLICATIONS

International Preliminary Report on Patentability received for PCT Patent Application No. PCT/EP2022/051747, mailed on May 9, 2023, 8 pages.

(Continued)

*Primary Examiner* — Mark S Kaucher

(74) *Attorney, Agent, or Firm* — Faegre Drinker Biddle & Reath LLP

(57) ABSTRACT

The present invention relates to aqueous polymer latexes of film-forming copolymer particles obtainable by aqueous emulsion polymerisation of monoethylenically monomers M, which mainly comprise non-ionic monomers of the group consisting of alkyl(meth)acrylates, cycloalkyl(meth) acrylates and monovinylaromatic hydrocarbon monomers and which additionally comprise 0.01 to 1% by weight, based on the total weight of monomers M, of at least one monoethylenically unsaturated monomer M2 having a hydrolysable silane group; and 0.1 to 2% by weight, based on the total weight of monomers M, of at least one monoethylenically unsaturated monomer M3 having an acidic phosphate group, or a salt thereof and where the copolymer particles in the polymer latex have volume median particle diameter of at least 250 nm, as determined by dynamic light scattering according to the ISO 13321:1996 standard. The polymer latexes are particularly suitable as binders in coating compositions having high pigment volume concentration (PVC) of preferably above 60% and provide good wet scrub resistance and opacity to coatings obtained therefrom. The present invention also relates to a process for producing such polymer latexes, to waterborne coating compositions containing these latexes and to the use of said polymer latexes for improving the wet scrub resistance and the opacity of coating compositions having a pigment volume concentration (PVC) of preferably above 60%.

18 Claims, No Drawings

(56) References Cited

U.S. PATENT DOCUMENTS

| | | | |
|---|---|---|---|
| 5,352,400 | A | 10/1994 | West |
| 5,401,582 | A | 3/1995 | Weyland et al. |
| 5,498,659 | A | 3/1996 | Esser |
| 5,516,453 | A | 5/1996 | Blankenship |
| 5,994,457 | A | 11/1999 | Stanger et al. |
| 6,031,038 | A | 2/2000 | Baumstark et al. |
| 6,096,858 | A | 8/2000 | Dobbelaar et al. |
| 2004/0143058 | A1 | 7/2004 | Guo et al. |
| 2006/0247367 | A1 | 11/2006 | Guo et al. |
| 2007/0208129 | A1 | 9/2007 | Finegan et al. |
| 2008/0269402 | A1* | 10/2008 | Maurice ................ C08F 220/14 524/547 |
| 2011/0009540 | A1 | 1/2011 | Terrenoire et al. |
| 2011/0151128 | A1 | 6/2011 | Boggs et al. |
| 2011/0166291 | A1 | 7/2011 | Tuerk et al. |
| 2011/0217471 | A1 | 9/2011 | Schwendeman et al. |
| 2013/0052457 | A1* | 2/2013 | Inui ........................ C09J 151/06 428/354 |
| 2015/0378558 | A1 | 12/2015 | Smith et al. |
| 2016/0289516 | A1* | 10/2016 | Makihata ................ B32B 27/06 |
| 2017/0349851 | A1* | 12/2017 | Tohyama ................. C09D 4/06 |
| 2020/0262942 | A1 | 8/2020 | Kainz et al. |

FOREIGN PATENT DOCUMENTS

| | | | |
|---|---|---|---|
| DE | 19805122 | A1 | 4/1999 |
| DE | 19828183 | A1 | 12/1999 |
| DE | 19839199 | A1 | 3/2000 |
| DE | 19840586 | A1 | 3/2000 |
| DE | 19847115 | C1 | 5/2000 |
| DE | 102004008015 | A1 | 9/2005 |
| DE | 102004031786 | A1 | 1/2006 |
| EP | 0061822 | A1 | 10/1982 |
| EP | 0184091 | A2 | 6/1986 |
| EP | 0277361 | A1 | 8/1988 |
| EP | 0307775 | A2 | 3/1989 |
| EP | 0507407 | A1 | 10/1992 |
| EP | 0628582 | A2 | 12/1994 |
| EP | 0710680 | A2 | 5/1996 |
| EP | 0771328 | A1 | 5/1997 |
| EP | 0789724 | A1 | 8/1997 |
| EP | 1013264 | A1 | 6/2000 |
| EP | 1227116 | A1 | 7/2002 |
| EP | 1541643 | A1 | 6/2005 |
| EP | 1582567 | A1 | 10/2005 |
| EP | 1584331 | A1 | 10/2005 |
| EP | 1832635 | A1 | 9/2007 |
| EP | 1988105 | A1 | 11/2008 |
| EP | 2184304 | A1 | 5/2010 |
| EP | 2257579 | B1 | 5/2017 |
| WO | 96/31550 | A1 | 10/1996 |
| WO | 2012/052508 | A2 | 4/2012 |
| WO | 2012/130712 | A1 | 10/2012 |
| WO | 2015/193192 | A1 | 12/2015 |
| WO | 2015/197662 | A1 | 12/2015 |
| WO | 2016/004116 | A1 | 1/2016 |
| WO | 2018/049034 | A1 | 3/2018 |

OTHER PUBLICATIONS

International Search Report and Written Opinion received for PCT Patent Application No. PCT/EP22/051747, mailed on Apr. 21, 2022, 9 pages.

* cited by examiner

AQUEOUS POLYMER LATEX

CROSS-REFERENCE TO RELATED APPLICATIONS

This application is a National stage application (under 35 U.S.C. § 371) of PCT/EP2022/051747, filed Jan. 26, 2022, which claims benefit of European Application No. 21153443.3, filed Jan. 26, 2021, both of which are incorporated herein by reference in their entirety.

The present invention relates to aqueous polymer latexes of film-forming copolymer particles obtainable by aqueous emulsion polymerisation of monoethylenically monomers M, which mainly comprise non-ionic monomers of the group consisting of alkyl(meth)acrylates, cycloalkyl(meth) acrylates and monovinylaromatic hydrocarbon monomers. The polymer latexes are particularly suitable as binders in coating compositions having high pigment volume concentration (PVC) of preferably above 60% and provide good wet scrub resistance and opacity to coatings obtained therefrom.

The present invention also relates to a process for producing such polymer latexes, to waterborne coating compositions containing these latexes and to the use of said polymer latexes for improving the wet scrub resistance and the opacity of coating compositions having a pigment volume concentration (PVC) of preferably above 60%.

Waterborne coating compositions, especially latex paints used for coating interior walls and ceilings, often consist mainly of pigments, such as especially $TiO_2$, fillers, such as especially chalk, and an aqueous polymer dispersion as binder. For cost reasons, such latex paints typically have a low binder content and consequently a high combined content of pigments and fillers, i.e. the PVC, which is defined as the ratio of the volume of pigments and fillers relative to the total volume consisting of the volumes of binder, pigments and fillers, is high, generally above 60% and in particular at least 65% or at least 70%.

For latex based interior paints, opacity and wet scrub resistance are particularly important. The opacity or hiding power is the ability of a coating obtained by applying the latex paint to hide the coated substrate, e.g. a wall surface, from view. Wet scrub resistance, on the other hand, is a measure of how abrasion proof the coating is, when subjected to repeated damp wiping.

In coating compositions having a moderate pigment/filler load, typically coating compositions having a PVC from 10 to 55%, hiding power/opacity of the coating is mainly provided by opacifying pigments, especially titanium dioxide ($TiO_2$), that are contained in the dried coating. However, $TiO_2$ particles tend to agglomeration, which reduces the light scattering caused by the particles. In order to develop their full opacifying capacity, the $TiO_2$ particles must therefore be well spaced within the coating composition. In coating compositions having a moderate pigment/filler load, good spacing of the $TiO_2$ particles can be achieved by certain binders, in which the particles are efficiently adsorbed and dispersed. The hiding power in high-PVK coating compositions having PVC of 60% or higher is not only caused by the pigments/fillers used, but also to a large extent by the air voids typically having diameters in the range of 100 to 500 nm that are formed during drying. The influence on the distribution of opacifying pigments therefore plays a rather subordinate role, since due to the high proportion of partly finely distributed filler in the high PVK coating compositions, separation of the opacifying pigments plays a lesser role than in the $TiO_2$— and binder-rich coating composition in the low PVC range.

For example, latex binders that include small amounts of copolymerized monomers carrying phosphate groups, as described in EP 2 257 579, EP 1 582 567 and EP 1 832 635, provide good hiding power in coating compositions having low PVC values. However, when formulated as a binder in a coating composition with high PVC values the polymer latexes described therein do not provide good wet scrub resistance of the finished coating.

Wet scrub resistance of a coating is dependent on several factors. In general, coatings prepared with latex paints having a low binder content, i.e. their PVC is high, are naturally prone to wet abrasion and thus decrease wet scrub resistance of the paint film. Increasing the air voids will of course further increase decrease wet scrub resistance. In contrast, the inclusion of monomers containing hydrolysable silane groups in the binder improves the wet scrub resistance of the coating, as reported in WO 2015/193192.

There is still a strong need for latex binders and latex paints which provide for beneficial coatings, especially interior coatings, which have a good balance of key properties, such as in particular opacity, wet scrub resistance and the efficiency of producing the corresponding latex paints.

Therefore, it is an object of the present invention to provide aqueous polymer latexes, which are useful as binders in latex paints, especially those for interior applications. The polymer latexes should enable the preparation of highly loaded latex paints, i.e. paints having a high PVC, that are more cost-effective due to their low binder content. The latex paints containing these polymer latexes should also allow for coatings, which feature good hiding power/opacity as well as high wet scrub resistance. In addition, the latex paints should be stable and not tend to form grit.

It was surprisingly found that these objectives can be achieved by polymer latexes described herein. Therefore, the invention in a first aspect relates to aqueous polymer latexes of film-forming copolymer particles, where the latexes are obtainable by aqueous emulsion polymerisation of ethylenically unsaturated monomers M, which comprise i) 90 to 99.85% by weight, based on the total weight of monomers M, of at least one monoethylenically unsaturated non-ionic monomer M1, which is selected from the group consisting of $C_1$-$C_{20}$-alkyl esters of acrylic acid, $C_5$-$C_{20}$-cycloalkylesters of acrylic acid, $C_1$-$C_{20}$-alkylesters of methacrylic acid, $C_5$-$C_{20}$-cycloalkylesters of methacrylic acid, and monovinyl aromatic hydrocarbon monomers and combinations thereof;

ii) 0.01 to 1% by weight, based on the total weight of monomers M, of at least one monoethylenically unsaturated monomer M2 having a hydrolysable silane group; and iii) 0.1 to 2% by weight, based on the total weight of monomers M, of at least one monoethylenically unsaturated monomer M3 having an acidic phosphate group, or a salt thereof;

where the monomers M do not comprise more than 1% by weight of ethylenically monomers that are selected from monomers M4, which bear an acidic group different from a phosphate group and salts thereof, and ethylenically unsaturated neutral monomers M5 having a solubility in water at 22° C. and 1 bar of at least 60 g/L, and where the copolymer particles in the polymer latex have volume median particle diameter of at least 250 nm, as determined by dynamic light scattering according to the ISO 13321:1996 standard.

The invention also relates to waterborne coating compositions, which contain a) a binder polymer in the form of the aqueous polymer latex as defined above; and b) at least one inorganic pigment and/or filler.

By using the polymer latex of the present invention as a binder, latex paints that have a high pigment load, but nonetheless are stable and do not tend to grit formation, can be produced efficiently and economically. Moreover, these latex paints of the present invention provide for good hiding power/opacity as well as high wet scrub resistance of the obtained coatings. In addition, the latex paints afford smooth film building without requiring significant amounts of volatile filming auxiliaries.

Without being bound to theory, the advantages obtained with the invention may be explained as follows. Due to the large polymer particles of the latex, a relatively large amount of binder material is accumulated at a few points of the dry paint film. On the one hand, this increases the formation of air voids in a size range, which suitable for increasing opacity. On the other hand, the expected reduced mechanical stability of the paint film and thus its reduced wet abrasion resistance due to the reduction in the number of "glue dots" in the paint film is compensated by improved surface interaction of the fillers/pigments/particles, presumably through adhesion of the polymer particles to the pigment/filler particles caused by the phosphate groups and presumably by the silane groups, and by increased internal strength polymer film caused by the silane groups (cohesion increase through cross-linking after previous film formation). The ability of phosphate-bearing binders to adsorb on oxidic surfaces does not exclusively or less serve to separate the $TiO_2$ than to compensate for the poorer distribution of the (fewer) polymer particles due to their larger particle size.

Here and throughout the specification, the term "(meth)acryl" includes both acryl and methacryl groups. Hence, the term "(meth)acrylate" includes acrylate and methacrylate, and the term "(meth)acrylamide" includes acrylamide and methacrylamide.

Here and throughout the specification, the term "waterborne coating composition" means a liquid aqueous coating composition containing water as the continuous phase in an amount sufficient to achieve flowability.

Here and throughout the specification, the terms "wt.-%" and "% by weight (% b.w.)" are used synonymously.

Here and throughout the specification, the term "pphm" means parts by weight per 100 parts of monomers and corresponds to the relative amount in % by weight of a certain monomer based on the total amount of monomers M.

Here and throughout the specification, the terms "ethoxylated" and "polyethoxylated" are used synonymously and refer to compounds having an oligo- or polyoxyethylene group, which is formed by repeating units $O—CH_2CH_2$. In this context, the term "degree of ethoxylation" relates to the number average of repeating units $O—CH_2CH_2$ in these compounds.

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. The term "$C_n$/$C_m$ alkyl" denominates a mixture of two alkyl groups, one having n carbon atoms, while the other having m carbon atoms.

For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, sec-butyl, isobutyl, tert-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl and in case of nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl their isomers, in particular mixtures of isomers such as "isononyl", "isodecyl". Examples of $C_1$-$C_4$-alkyl are for example methyl, ethyl, propyl, 1-methylethyl, butyl, 1-methylpropyl, 2-methylpropyl or 1,1-dimethylethyl.

The term "$C_5$-$C_{20}$-cycloalkyl" as used herein refers to a mono- or bicyclic cycloalkyl radical which is unsubstituted or substituted by 1, 2, 3 or 4 $C_1$-$C_4$-alkyl radicals, e.g. methyl groups, where the total number of carbon atoms of $C_5$-$C_{20}$-cycloalkyl is from 5 to 20. Examples of $C_5$-$C_{20}$-alkyl include but are not limited to cyclopentyl, cyclohexyl, methylcyclohexyl, dimethylcyclohexyl, cycloheptyl, cyclooctyl, cyclododecyl, cyclohexadecyl, norbornyl (=bicyclo[2.2.1]heptyl) and isobornyl (=1,7,7-trimethylbicyclo[2.2.1]heptyl).

For the purposes of the invention it has been found beneficial, if the particles of the copolymer contained in the polymer latex have a volume median particle diameter of at least 250 nm, preferably of at least 260 nm and especially of at least 270 nm. The volume median particle diameter is also termed the Dv50 particle diameter or d(v, 0.5) particle diameter. Preferably, the volume median diameter of the copolymer particles in the polymer latex is in the range from 260 to 500 nm, in particular in the range from 265 to 450 nm, and specifically in the range from 270 to 400 nm. The volume median particle size as well as the distribution of particle size given herein refers to the values determined by quasielastic light scattering (QELS), also known as dynamic light scattering (DLS). The measurement method is described in the ISO 13321:1996 standard.

The determination of the particle size distribution, and thus the Z-average particle diameter, by QELS can be carried out using a High-Performance Particle Sizer (HPPS). For this purpose, a sample of the aqueous polymer latex will be diluted, and the dilution will be analyzed. In the context of QELS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters:

measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gives an average value of the second order cumulant analysis (mean of fits), i.e. Z-average. The "mean of fits" is an average, intensity-weighted hydrodynamic particle diameter in nm.

The median particle size as well as the distribution of particle size may also be determined by Hydrodynamic Chromatography fractionation (HDC), as for example described by H. Wiese, "Characterization of Aqueous Polymer Dispersions" in Polymer Dispersions and Their Industrial Applications (Wiley-VCH, 2002), pp. 41-73. In particular, the volume median particle diameter is determined according to the following protocol:

The volume-based particle size distributions of the polymer latexes were measured by capillary hydrodynamic fractionation, also referred to hydrodynamic chromatography (HDC) with a "CHDF3000" device from Matec Applied Sciences, USA, using as column a "PL-PSDA cartridge, Type-2" of Agilent Technologies, USA. Each sample was first diluted to a solids content of 1% by weight, filtered through a filter with pore size 1.2 μm and injected with an autosampler with an injection volume of 25 μL For further details, reference is made to the examples and the description below. The HDC method provides particle sizes comparable or almost identical to the particle sizes provided by the QELS method. While in the low particle size range the values are identical within the limits of measurement accuracy at higher particle sizes the values may differ by 10% or less than 15 nm. Typically, the values provided by the HDC method are somewhat higher than the values provided by the QELS method.

The particle size distribution of the copolymer particles contained in the polymer latex may be monomodal, which means that the distribution function of the particle size has a single maximum, or polymodal, in particular bimodal, which means that the distribution function of the particle size has at least two maxima. Generally, the particle size distribution of the polymer particles in the polymer dispersion obtainable by the process, as described herein, is monomodal or almost monomodal.

According to the invention, the polymer latex is obtainable by aqueous emulsion polymerisation of monomers M, which comprise, as defined herein, a combination of 90 to 99.85% by weight, based on the total weight of monomers M, of at least one non-ionic monomer M1, 0.01 to 1% by weight, based on the total weight of monomers M, of at least one monomer M2 having a hydrolysable silane group and 0.1 to 2% by weight, based on the total weight of monomers M, of at least one monomer M3 having an acidic phosphate group. Since the polymerized monomers form the polymer latex particles, it is apparent that the following statements with regard to the kind of monomers comprised by the monomers M and the relative amounts of the different monomers M will also apply to the polymer latex particles.

According to the invention, the monomers M1 are selected from the group consisting of $C_1$-$C_{20}$-alkyl esters of acrylic acid, $C_5$-$C_{20}$-cycloalkyl esters of acrylic acid, $C_1$-$C_{20}$-alkyl esters of methacrylic acid, $C_5$-$C_{20}$-cycloalkyl esters of methacrylic acid and monovinyl aromatic hydrocarbon monomers.

Suitable $C_1$-$C_{20}$-alkyl esters of acrylic acid include but are not limited to methyl acrylate, ethyl acrylate, n-propyl acrylate, isopropyl acrylate, n-butyl acrylate, sec-butyl acrylate, isobutyl acrylate, tert-butyl acrylate, n-pentyl acrylate, isoamyl acrylate, 2-pentyl acrylate, n-hexyl acrylate, n-octyl acrylate, 2-ethylhexyl acrylate, n-decyl acrylate, isodecyl acrylate, 2-propylheptyl acrylate, lauryl acrylate, $C_{12}/C_{14}$-alkyl acrylate, $C_{12}$-$C_{15}$-alkyl acrylate, isotridecyl acrylate, $C_{16}/C_{18}$-alkyl acrylate and stearyl acrylate and mixtures thereof.

Suitable $C_5$-$C_{20}$-cycloalkyl esters of acrylic acid include but are not limited to cyclohexylacrylate, norbornylacrylate, isobornylacrylate and mixtures thereof.

Suitable $C_1$-$C_{20}$-alkyl esters of methacrylic acid include but are not limited to methyl methacrylate, ethyl methacrylate, n-propyl methacrylate, isopropyl methacrylate, n-butyl methacrylate, sec-butyl methacrylate, isobutyl methacrylate, tert-butyl methacrylate, n-pentyl methacrylate, isoamyl methacrylate, 2-pentyl methacrylate, n-hexyl methacrylate, n-octyl methacrylate, 2-ethylhexyl methacrylate, n-decyl methacrylate, isodecyl acrylate, 2-propylheptyl methacrylate, lauryl methacrylate, $C_{12}/C_{14}$-alkyl methacrylate, $C_{12}$-$C_{15}$-alkyl methacrylate, isotridecyl methacrylate, $C_{16}/C_{18}$-alkyl methacrylate, stearyl methacrylate and mixtures thereof.

Suitable $C_5$-$C_{20}$-cycloalkyl esters of methacrylic acid include but are not limited to cyclohexyl methacrylate, norbornyl methacrylate, isobornyl methacrylate and mixtures thereof.

Suitable monovinyl aromatic hydrocarbon monomers include but are not limited to mono-vinyl substituted aromatic hydrocarbons such as styrene, 2-methylstyrene, 3-methylstyrene, 4-methylstyrene, 2-n-butylstyrene, 4-n-butylstyrene, 4-n-decylstyrene, 4-cyclohexylstyrene, 2,4,6-trimethyl styrene, α-methylstyrene, (1-ethylvinyl)benzene, 1-vinyl naphthalene and mixtures thereof, with particular preference given to styrene.

Preferably, monomers M1 are selected from the group consisting of

- $C_2$-$C_{12}$-alkyl esters of acrylic acid, in particular ethyl acrylate, n-butyl acrylate, isobutyl acrylate, tert-butyl acrylate, n-hexyl acrylate, n-octyl acrylate, 2-ethylhexyl acrylate, n-decyl acrylate, isodecyl acrylate, 2-propylheptyl acrylate, lauryl acrylate and mixtures thereof, such as for example mixtures of n-butyl acrylate and 2-ethylhexyl acrylate, mixtures of n-butyl acrylate and isobutyl acrylate, mixtures of isobutyl acrylate and 2-ethylhexyl acrylate, mixtures of n-butyl acrylate, isobutyl acrylate and 2-ethylhexyl acrylate, mixtures of n-butyl acrylate and ethyl acrylate, or mixtures of ethyl acrylate, n-butyl acrylate, tert-butyl acrylate and 2-ethylhexyl acrylate;
- $C_1$-$C_4$-alkyl esters of methacrylic acid, in particular methyl methacrylate; and
- monovinyl aromatic hydrocarbon monomers, especially styrene.

It is also preferred that the monomers M1 comprise a mixture of at least one monomer selected from $C_1$-$C_{12}$-alkyl esters of acrylic and one monomer selected from monovinyl aromatic hydrocarbon monomers.

In a particular group of embodiments, the monomers M1 comprise at least 90% by weight, in particular at least 95% by weight, specifically at least 98% by weight, based in each case on the total weight of monomers M, of a combination of at least one monovinyl aromatic hydrocarbon monomer as a monomer M1a and at least one $C_2$-$C_{12}$-alkyl ester of acrylic acid as a monomer M1b, where the monomer M1a is preferably styrene and the at least one monomer M1b is preferably selected from ethyl acrylate, n-butyl acrylate, isobutyl acrylate, tert-butyl acrylate, 2-ethylhexyl acrylate, 2-propylheptyl acrylate and combinations thereof. In this particular group of embodiments, the monomer M1a is more preferably styrene and the at least one monomer M1b is more preferably n-butyl acrylate, isobutyl acrylate, 2-ethylhexylacrylate or a combinations thereof. Specifically, in this particular group of embodiments, the monomer M1a is in particular styrene and the monomer M1b is in particular a combination of 2-ethylhexylacrylate and n-butyl acrylate.

In the aforementioned combinations of monomers M1a and M1b, the relative amount of M1a and M1b may vary typically from 10:1 to 1:10, preferably from 5:1 to 1:5, more preferably from 3:1 to 1:3, in particular from 1.5:1 to 1:2, specifically from 1:1 to 1:1.6. The ratio of monomers M1a to M1b will affect the glass transition temperature and a proper mixture will result in the desired glass transition temperatures discussed herein below.

The total amount of monomers M1 is from 90 to 99.85% by weight, preferably from 93 to 99.85% by weight, more preferably from 95 to 99.85% by weight, in particular from 95 to 99.5% by weight, more particularly from 96 to 99.5% by weight, especially from 96 to 99.4% and specifically from 97 to 99.4% by weight, based in each case on the total weight of the monomers M.

According to the invention, the monomers M2 are selected from monoethylenically unsaturated monomers bearing a hydrolysable silane group. In the context of the present invention a hydrolysable silane group refers to a silane group, which bears 1, 2 or 3 radicals, which are cleaved off from the silicon atom in the presence of water to form Si—OH groups. Typically the radicals are O-bound, such as alkoxy, cycloalkoxy or phenoxy. The hydrolysable silane group is typically bound to a carbon atom of the monomer. In particular, the silicon atom of the hydrolysable silane group bears n alkoxy groups and n−3 alkyl groups, with n being 1, 2 or 3, where the aforementioned groups are bound to the silicon atom. In this context, alkoxy is preferably selected from $C_1$-$C_4$-alkoxy and in particular selected from methoxy and ethoxy, while alkyl moiety is preferably selected from $C_1$-$C_4$-alkyl, such as methyl or ethyl. The hydrolysable silane group of a suitable monomer M2 is preferably a trialkoxysilane group (n=3) or a alkyldialkoxysilane group (n=2), where the alkoxy moieties of the trialkoxysilane group or the alkyldialkoxysilane group, independently from each other, are preferably selected from $C_1$-$C_4$-alkoxy and in particular selected from methoxy and ethoxy, while the alkyl moiety of the alkyldialkoxysilane group is preferably selected from $C_1$-$C_4$-alkyl and in particular selected from methyl and ethyl. Particular preference is given to monomers M2 that bear a trialkoxysilane group or a alkyldialkoxysilane group, where in each case all alkoxy moieties are identical and are selected from $C_1$-$C_4$-alkoxy, especially from methoxy and ethoxy, while the alkyl moiety of the alkyldialkoxysilane group is $C_1$-$C_4$-alkyl and specifically methyl or ethyl.

Preferred monomers M2 are selected from the group consisting of vinyltrialkoxysilanes, such as in particular vinyltrimethoxysilane or vinyltriethoxysilane, alkylvinyldialkoxysilanes, such as in particular methylvinyldimethoxysilane, methylvinyldiethoxysilane or ethylvinyldiethoxysilane, acryloxyalkyltrialkoxysilanes, such as in particular acryloxyethyltrimethoxysilane, acryloxyethyltriethoxysilane, acryloxypropyltrimethoxysilane or acryloxypropyltriethoxysilane, methacryloxyalkyltrialkoxysilanes, such as in particular methacryloxyethyltrimethoxysilane, methacryloxyethyltriethoxysilane, methacryloxypropyltrimethoxysilane or methacryloxypropyltriethoxysilane, acryloxyalkylalkyldialkoxysilanes, such as in particular acryloxyethyl-methyldimethoxysilane, acryloxyethyl-methyldiethoxysilane, acryloxypropyl-methyldimethoxysilane or acryloxypropyl-methyldiethoxysilane, and methacryloxyalkyltrialkoxysilanes, such as in particular methacryloxyethyl-methyldimethoxysilane, methacryloxyethyl-methyldiethoxysilane, methacryloxypropyl-methyldimethoxysilane or methacryloxypropyl-methyldiethoxysilane.

Particular preference is given to monomers M2 selected from the group consisting of vinyltrialkoxysilanes, such as in particular vinyltrimethoxysilane or vinyltriethoxysilane, acryloxyalkyltrialkoxysilanes, such as in particular acryloxyethyltrimethoxysilane, acryloxyethyltriethoxysilane, acryloxypropyltrimethoxysilane or acryloxypropyltriethoxysilane, and methacryloxyalkyltrialkoxysilanes, such as in particular methacryloxyethyltrimethoxysilane, methacryloxyethyltriethoxysilane, methacryloxypropyltrimethoxysilane or methacryloxypropyltriethoxysilane.

In a particularly preferred embodiment of the invention, the monomers M2 are selected from methacryloxyalkyltrialkoxysilanes, and in particular are methacryloxypropyltrimethoxysilane.

The total amount of monomers M2 is from 0.01 to 1% by weight, preferably from 0.03 to 0.7% by weight, more preferably 0.05 to 0.5% by weight, in particular from 0.07 to 0.4% by weight, and specifically from 0.1 to 0.3% by weight, based in each case on the total weight of the monomers M.

According to the invention, the monomers M3 are selected from monoethylenically unsaturated monomers bearing an acidic phosphate group and their salts. The acidic phosphate group is preferably included in the monomers M3 as a monophosphate ester group. Suitable monomers M3 are for instance the monophosphate esters of $C_1$-$C_{10}$-alkenols and their salts, especially the monophosphate esters of $C_1$-$C_4$-alkenols and their salts, such as monoallyl phosphate or mono-3-butenyl phosphate, and (meth)acrylic acid esters bearing a monophosphate group and the salts thereof. Preference is given to the monomers of the formula (I) and the salts thereof:

$$H_2C{=}C(R){-}C({=}O){-}O\text{-}A\text{-}[O\text{-}Alk]_n{-}O{-}P({=}O)(OH)_2 \qquad (I)$$

wherein

A is $C_2$-$C_4$-alkandiyl, in particular 1,2-ethanediyl, 1,3-propandiyl or 1,2-propandiyl, Alk within the repeating unit $[Alk\text{-}O]_n$ is identical or different and 1,2-ethanediyl or 1,2-propandiyl, n is 0 or an integer from 1 to 20, in particular 0 or an integer from 2 to 10, and R is hydrogen or methyl.

The monomers M3 are preferably selected from monomers of the formula (I), where the variables A, Alk, n and R have the herein defined meanings, in particular the meanings described as preferred.

In a particular group of embodiments of the present invention, the monomers M3 are selected from compounds of the formula (I), wherein A is $C_2$-$C_4$-alkandiyl, preferably is 1,2-ethanediyl or 1,3-propandiyl, and in particular is 1,2-ethanediyl, n is 0, and R is hydrogen or methyl, and in particular methyl.

In this particular group of embodiments, the monomers M3 are particularly selected from compounds of the formula (I), wherein A is 1,2-ethanediyl or 1,3-propandiyl and in particular 1,2-ethanediyl; n is 0 and R is methyl. Thus, in this particular group of embodiments, the monomers M3 are especially mono-methacryloxyethyl phosphate or mono-methacryloxypropyl phosphate. Particular preference is given here to mono-methacryloxyethyl phosphate, i.e. the monomer of formula (I) with A being 1,2-ethanediyl, n being 0 and R being methyl.

In a further particular group of embodiments of the present invention, the monomers M3 are selected from compounds of the formula (I), wherein A and Alk are identical and are selected from $C_2$-$C_4$-alkandiyl, in particular are both 1,2-ethanediyl or 1,2-propandiyl, and specifically are both 1,2-ethanediyl, n is an integer from 1 to 20, and in particular an integer from 2 to 10, and R is hydrogen or methyl, and in particular methyl.

In this particular group of embodiments, the monomers M3 are particularly selected from compounds of the formula (I), wherein A and Alk are both either 1,2-ethanediyl or 1,2-propandiyl, n is an integer from 1 to 20 and especially from 2 to 10, and R is methyl. Thus, in this particular group of embodiments, the monomers M3 are especially mono-methacryl(oxy-1,2-ethanediyl) 2-10 phosphate or mono-methacryl(oxy-1,2-propandiyl)$_{2-10}$ phosphate. Particular preference is given here to mono-methacryl(oxy-1,2-ethanediyl)$_{2-10}$ phosphate, i.e. the monomer of formula (I) with A and Alk being 1,2-ethanediyl, n being an integer from 2 to 10 and R being methyl.

In a further particular group of embodiments of the present invention, the monomers M3 are selected from mono-(meth)acryloxyethyl phosphate, mono-(meth)acryl(oxy-1,2-ethanediyl)$_{2-20}$ phosphate and mono-(meth)acryl(oxy-1,2-propandiyl)$_{2-20}$ phosphate, preferably selected from mono-methacryloxyethyl phosphate, mono-(meth)acryl(oxy-1,2-ethanediyl)$_{2-10}$ phosphate and mono-(meth)acryl(oxy-1,2-propandiyl)$_{2-10}$ phosphate, in particular selected from mono-methacryloxyethyl phosphate, mono-methacryl(oxy-1,2-ethanediyl)$_{2-10}$ phosphate and mono-methacryl(oxy-1,2-propandiyl)$_{2-10}$ phosphate, and especially are mono-methacryl(oxy-1,2-ethanediyl)$_{2-10}$ phosphate.

The total amount of monomers M3 is from 0.1 to 2% by weight, preferably from 0.2 to 1.8% by weight, more preferably 0.3 to 1.6% by weight, in particular from 0.35 to 1.4% by weight, and specifically from 0.4 to 1.3% by weight, based in each case on the total weight of the monomers M.

According to the invention, the polymer latex is obtainable by aqueous emulsion polymerisation of monomers M which, based on the total weight of monomers M, do not comprise more than 1% by weight, preferably not more than 0.8% by weight, more preferably not more than 0.7% by weight, in particular not more than 0.6% by weight, especially not more than 0.5% by weight, based on the total weight of the monomers M, of monomers selected from monomers M4 which bear an acidic group different from a phosphate group and salts thereof, and monomers M5, which a neutral monomers and have a solubility in deionized water at 22° C. and 1 bar of at least 60 g/L.

The monomers M which form the polymer latex may comprise none of the monomers M4 and M5, they may comprise either a monomer M4 or a monomer M5 or both monomers M4 and M5. The total amount of monomers M4 and M4 will not exceed 1% by weight, preferably be not more than 0.8% by weight, more preferably be not more than 0.7% by weight, in particular be not more than 0.6% by weight, especially be not more than 0.5% by weight, based on the total weight of the monomers M.

In the above context, the term "monomers M4 which bear acidic group" means a monoethylenically unsaturated monomer containing at least one acidic functional group, which monomer has a p$K_a$ value of below 8 and in particular of below 6. For a definition of the acid dissociation constant $K_a$ reference is made for example to "Handbook of Chemistry and Physics", editor: D. R. Lide, 76$^{th}$ ed., CRC Press, Inc., 1995, pp. 8-43-8-55 and the references cited therein. Accordingly, monomers M4 are monomers that in addition to an ethylenically unsaturated double bond bear an acid group or a corresponding salt group derived therefrom, such as especially a carboxyl group or a carboxylate group, a sulfuric acid monoester group or a sulfate monoester group, a sulfonic acid group or a sulfonate group, a sulfinic acid group or a sufinate group, a phosphonic acid group or a phosphonate group. Examples of monomers M4 are therefore e.g. (meth)acrylic acid, crotonic acid, fumaric acid, maleic acid, itaconic acid, vinylsulfonic acid, methallyl sulfonic acid, 4-vinyl-benzenesulfonic acid, 2-acrylamido-ethanesulfonic acid, 2-acrylamido-2-methylpropanesulfonic acid, 2-sulfethyl (meth)acrylate and the salts of these acids, such as in particular their alkali metal salts or ammonium salts.

The total amount of monomers M4 is generally not more than 0.8% by weight, preferably not more than 0.7% by weight, in particular not more than 0.6% by weight, based in each case on the total weight of the monomers M. If present, the amount of monomers M4 is typically at least 0.05% by weight, in particular at least 0.1% by weight, e.g. in the range of 0.05 to 0.8% by weight, more particularly in the range of 0.1 to 0.7% by weight, especially in the range of 0.1 to 0.6% by weight, based in each case on the total weight of the monomers M.

Examples of monoethylenically unsaturated monomer M5 are generally those having a functional group selected from hydroxyalkyl groups, in particular hydroxy-$C_2$-$C_4$-alkyl groups, a primary carboxamide group, urea groups and keto groups.

Examples for monomers M5 having a carboxamide group include but are not limited to primary amides of monoethylenically unsaturated monocarboxylic acids having 3 to 6 carbon atoms, such as acrylamide and methacrylamide.

Examples for monomers M5 having a hydroxyalkyl group, in particular a hydroxy-$C_2$-$C_4$-alkyl group are the $C_2$-$C_4$-hydroxyalkyl esters of acrylic acid or methacrylic acid, such as hydroxyethyl acrylate, hydroxypropyl acrylate, hydroxybutyl acrylate, hydroxyethyl methacrylate, hydroxypropyl methacrylate, hydroxybutyl methacrylate and the like.

Examples for monomers M5 having an urea group are the $C_1$-$C_4$-alkyl esters of acrylic acid or methacrylic acid and the N—$C_1$-$C_4$-alkyl amides of acrylic acid or methacrylic acid, where the $C_1$-$C_4$-alkyl group bears an urea group or a 2-oxoimidazolin group, such as 2-(2-oxo-imidazolidin-1-yl)ethyl acrylate, 2-(2-oxo-imidazolidin-1-yl)ethyl methacrylate, which are also termed 2-ureido acrylate and 2-ureido methacrylate, respectively, N-(2-acryloxyethyl) urea, N-(2-methacryloxyethyl) urea, N-(2-(2-oxo-imidazolidin-1-yl)ethyl) acrylamide, N-(2-(2-oxo-imidazolidin-1-yl)ethyl) methacrylamide, as well as allyl or vinyl substituted ureas and allyl or vinyl substituted 2-oxoimidazolin compounds, such as 1-allyl-2-oxoimidazolin, N-allyl urea and N-vinylurea.

Examples for monomers M5 having a keto group (hereinafter monomers M3c) are the i) $C_2$-$C_8$-oxoalkyl esters of acrylic acid or methacrylic acid and the N—$C_2$-$C_8$-oxoalkyl amides of acrylic acid or methacrylic acid, such as diacetoneacrylamide (DAAM), and diacetonemethacrylamide, and ii) $C_1$-$C_4$-alkyl esters of acrylic acid or methacrylic acid and the N—$C_1$-$C_4$-alkyl amides of acrylic acid or methacrylic acid, where the $C_1$-$C_4$-alkyl group bears a 2-acetylacetoxy group of the formula O—C(═O)—$CH_2$—C(═O)—$CH_3$ (also termed acetoacetoxy group), such as acetoacetoxyethyl acrylate, acetoacetoxypropyl methacrylate, acetoacetoxybutyl methacrylate and 2-(acetoacetoxy)ethyl methacrylate.

The total amount of monomers M5 is generally not more than 0.8% by weight, preferably not more than 0.7% by weight, in particular not more than 0.6% by weight, based in each case on the total weight of the monomers M. If present, the amount of monomers M5 is typically at least 0.05% by weight, in particular at least 0.1% by weight, e.g. in the range of 0.05 to 0.8% by weight, more particularly in the range of 0.1 to 0.7% by weight, especially in the range of 0.1 to 0.6% by weight, based in each case on the total weight of the monomers M.

The monomers M may also include multiethylenically unsaturated monomers (monomers M6), i.e. monomers having at least two non-conjugated ethylenically unsaturated double bounds. The amounts of said monomers M6 will generally not exceed 1 pphm and are frequently absent or present in an amount of at most 0.1 pphm, based on the amount of monomers forming the polymer in the polymer latex.

Examples of multiethylenically unsaturated monomers M6 include:

diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;

monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as allyl acrylate and allyl methacrylate; and divinyl aromatic compounds, such as 1,3-divinyl benzene, 1,4-divinyl benzene.

In particular, the monomers M consist of:

90 to 99.85% by weight, preferably from 93 to 99.85% by weight, more preferably from 95 to 99.85% by weight, in particular from 95 to 99.5% by weight, more particularly from 96 to 99.5% by weight, especially from 96 to 99.4% and specifically from 97 to 99.4% by weight, based on the total weight of the monomers contained in the monomer composition M, of one or more non-ionic monomers M1;

0.01 to 1% by weight, preferably from 0.03 to 0.7% by weight, more preferably 0.05 to 0.5% by weight, in particular from 0.07 to 0.4% by weight, and specifically from 0.1 to 0.3% by weight, based on the total weight of the monomers contained in the monomer composition M, of one or more monomers M2;

0.1 to 2% by weight, preferably from 0.2 to 1.8% by weight, more preferably 0.3 to 1.6% by weight, in particular from 0.35 to 1.4% by weight, and specifically from 0.4 to 1.3% by weight, based on the total weight of the monomers contained in the monomer composition M, of one or more monomers M3;

0 to 1% by weight, preferably from 0 to 0.8% by weight, more preferably 0 to 0.7% by weight, in particular from 0 to 0.6% by weight, based on the total weight of the monomers contained in the monomer composition M, of one or more monomers M4 and/or M5.

The copolymer contained in the polymer particles of the aqueous polymer latex according to the present invention usually shows a glass transition. For the purpose of this invention, the glass transition temperature Tg does usually not exceed 50° C., preferably not exceed 40° C., in particular not exceed 30° C., e.g. is frequently in the range of −30 to +50° C., preferably in the range of −25 to +40° C., and in particular in the range from −20 to +30° C.

The glass transition temperature as referred to herein is the actual glass transition temperature, which can be determined experimentally by the differential scanning calorimetry (DSC) method according to ISO 11357-2:2013, preferably with sample preparation according to ISO 16805:2003.

The actual glass transition temperature depends from the monomer compositions forming the copolymer contained in the polymer particles of the aqueous polymer latex according to the present invention, while a theoretical glass transition temperature $Tg^t$ can be calculated from the monomer composition used in the emulsion polymerisation. The theoretical glass transition temperatures are usually calculated from the monomer composition by the Fox equation:

$$1/Tg^t = x_a/Tg_a + x_b/Tg_b + \ldots\ x_n/Tg_n,$$

In this equation, $x_a$, $x_b$, . . . $x_n$ are the mass fractions of the monomers a, b, . . . n, and $Tg_a$, $Tg_b$, . . . $Tg_n$ are the actual glass transition temperatures in Kelvin of the homopolymers synthesized from only one of the monomers a, b, . . . n at a time. The Fox equation is described by T. G. Fox in Bull. Am. Phys. Soc. 1956, 1, page 123 and as well as in Ullmann's Encyclopädie der technischen Chemie [Ullmann's Encyclopedia of Industrial Chemistry], vol. 19, p. 18, 4th ed., Verlag Chemie, Weinheim, 1980. The actual Tg values for the homopolymers of most monomers are known and listed, for example, in Ullmann's Encyclopädie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, 3rd Ed. J. Wiley, New York 1989 and 4th Ed. J. Wiley, New York 2004.

Usually, the theoretical glass temperature $Tg^t$ calculated according to Fox as described herein and the experimentally determined glass transition temperature as described herein are similar or even same and do not deviate from each other by more than 5 K, in particular they deviate not more than 2 K. Accordingly, both the actual and the theoretical glass transition temperatures of the copolymer can be adjusted by choosing proper monomers a, b . . . n and their mass fractions $x_a$, $x_b$, . . $x_n$ in the monomer composition so to arrive at the desired glass transition temperature Tg. It is common knowledge for a skilled person to choose the proper amounts of monomers a, b . . . n for obtaining a copolymer with the desired glass transition temperature.

Furthermore, the aqueous polymer latex of the present invention has a minimum film forming temperature (MFFT) that is typically not more than 15° C., preferably not more than 10° C., in particular not more than 8° C. and specifically not more than 5° C. The MFFT is defined as the lowest temperature at which a latex paint applied to a surface of a substrate still forms a closed, uniform and crack-free coating after drying (compare Ullmann's Encyclopädie der technischen Chemie [Ullmann's Encyclopedia of Industrial Chemistry], vol. 19, 4th ed., Verlag Chemie, Weinheim, 1980).

Within the copolymer particles of the polymer latex according to the present invention the copolymerized functional monomers M2 bearing a hydrolysable silane group and the functional monomers M3 bearing an acidic phosphate group may, independently of each other, be evenly or unevenly distributed. For example, the copolymerized monomers M2 can be located predominantly on the surface or close to the surface of the polymer particles, while the copolymerized monomers M3 are located predominantly in the interior of the particles, or vice versa.

In this context, the expression "interior of the particles" means an inner area within the polymer particles. In contrast thereto, the expression "on the surface or close to the surface of the polymer particles" refers to the outer area of the particles and in particular means the area of the particles that is outside the "interior of the particles". In addition, the expression "predominantly located" here means that usually at least 60% by weight, preferably at least 70% by weight, more preferably at least 80% by weight and especially at least 90% by weight of the monomers M2 or the monomers M3 are located in the specified area of the copolymer particles, based on the total weight of the polymerized monomers M2 or M3.

In a group 1 of embodiments, the functional monomers M2 and the functional monomers M3 are both, in copolymerized form, evenly distributed or at least almost evenly distributed in the total volume of the particles of the latex, i.e. both the monomers M2 and the monomers M3 both in the inner area as well as on the surface or close to the surface of the polymer particles.

In another preferred group 2 of embodiments, the copolymerized functional monomers M2 are located predominantly on the surface or close to the surface, i.e. within or on the outer spherical shell, of the polymer particles of the latex, while the copolymerized monomers M3 are located predominantly in the inner area around the center of the particles. In this group 2 of embodiments, the inner area is preferably an inner sphere as defined above, whose diameter is usually 40 to 85%, preferably 40 to 60%, in particular 45 to 55% of the average diameter, in particular the Z-average diameter, of the polymer particles. Accordingly, the remaining area of the polymer particles that is outside this inner sphere corresponds to the outer spherical shell, in which the monomers M2 are predominantly located.

In a further particularly preferred group 3 of embodiments, the copolymerized functional monomers M3 are located predominantly on the surface or close to the surface of the polymer particles of the latex. In a particularly preferred subgroup of group 3 of embodiments, which is herein termed group 3' of embodiments, in addition the copolymerized monomers M2 are located predominantly in the interior of the particles.

As pointed out above, the aqueous polymer latex of the invention is obtainable by aqueous emulsion polymerisation of the monomers M. Accordingly, the present invention is also directed to a process for producing the inventive aqueous polymer latex, which comprises performing an aqueous emulsion polymerisation, in particular a free-radical emulsion polymerisation, of the monomers M. Said process of the invention is described in more detail herein below.

The aqueous emulsion polymerization of the process of the present invention is usually performed in an aqueous polymerisation medium, which as well as water, comprises at least one surface-active substance, so-called surfactants. Suitable surfactants typically comprise emulsifiers and provide micelles, in which the polymerisation occurs, and which serve to stabilize the monomer droplets during aqueous emulsion polymerisation and also growing polymer particles. The surfactants used in the emulsion polymerisation are usually not separated from the polymer latex, but remain in the aqueous polymer latex obtainable by the emulsion polymerisation of the monomers M.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,

- the salts, especially the alkali metal and ammonium salts, of alkyl sulfates, especially of $C_8$-$C_{22}$-alkyl sulfates,
- the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40),
- the salts, especially the alkali metal and ammonium salts, of alkylsulfonic acids, especially of $C_8$-$C_{22}$-alkylsulfonic acids,
- the salts, especially the alkali metal and ammonium salts, of dialkyl esters, especially di-$C_4$-$C_{18}$-alkyl esters of sulfosuccinic acid,
- the salts, especially the alkali metal and ammonium salts, of alkylbenzenesulfonic acids, especially of $C_4$-$C_{22}$-alkylbenzenesulfonic acids, and
- the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:

- the salts, especially the alkali metal and ammonium salts, of alkyl sulfates, especially of $C_8$-$C_{22}$-alkyl sulfates, the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- of sulfuric monoesters of ethoxylated alkylphenols, especially of sulfuric monoesters of ethoxylated $C_4$-$C_{18}$-alkylphenols (EO level preferably 3 to 40),
- of alkylbenzenesulfonic acids, especially of $C_4$-$C_{22}$-alkylbenzenesulfonic acids, and
- of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifies, which bear a phosphate or phosphonate group, include, but are not limited to the following salts are selected from the following groups:

- the salts, especially the alkali metal and ammonium salts, of mono- and dialkyl phosphates, especially $C_8$-$C_{22}$-alkyl phosphates,
- the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20,
- the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40),
- the salts, especially the alkali metal and ammonium salts, of alkylphosphonic acids, especially $C_8$-$C_{22}$-alkylphosphonic acids and
- the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from nonionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

For the purposes of the invention it has been found beneficial, if the total amount of surfactants present in the emulsion polymerisation of the monomers M is in the range from 0.5% to 8% by weight, in particular in the range from 1% to 6% by weight, especially in the range from 2% to 5% by weight, based on the total amount of the monomers M polymerized in the emulsion polymerisation.

The aqueous reaction medium of the emulsion polymerization may, in principle, also comprise minor amounts (≤5% by weight) of water-soluble organic solvents, for example methanol, ethanol, isopropanol, butanols, pentanols, but also acetone, etc.

Preferably, however, the process of the invention is conducted in the complete or almost complete absence of such solvents.

The emulsion polymerisation of the monomers M is preferably performed by a so-called monomer feed process, which means that at least 90% by weight, in particular at least 95% by weight, especially at least 98% by weight, or the total amount of the monomers M to be polymerized are fed into the polymerisation reaction under polymerisation conditions.

Here and in the following, the term "polymerisation conditions" is well understood to mean those temperatures under which the aqueous emulsion polymerisation proceeds at sufficient polymerisation rate. The temperature depends particularly on the polymerisation initiator, its concentration in the reaction mixture and the reactivity of the monomers. Suitable polymerisation conditions can be determined by routine. In case of a free-radical aqueous emulsion polymerisation, the polymerisation is initiated by a so called free-radical initiator, which is a compound that decomposes to form free radicals, which initiate the polymerisation of the monomers. Advantageously, the type and amount of the free-radical initiator, polymerisation temperature and polymerisation pressure are selected such that a sufficient number of initiating radicals is always present to initiate or to maintain the polymerisation reaction.

Preferably, at least a portion of the surfactants, e.g. at least 90% by weight, in particular at least 95% by weight, especially at least 98% by weight, based on the total amount of surfactants used in the aqueous emulsion polymerisation of the monomers M, is also fed into the polymerisation reaction together with the portion of the monomers M fed into the polymerisation reaction. In particular, the monomers M, which are fed to the polymerisation reaction, are fed in the form of an aqueous emulsion, which contains at least a portion of the surfactants. The amount of the surfactants which is fed into the polymerisation reaction is frequently in the range from 1% to 6% by weight, especially in the range from 2% to 5% by weight, based on the total amount of monomers M.

More particularly, it has been found to be suitable to establish the polymerisation conditions and to initially charge at least a portion of the free-radical initiator into the polymerisation vessel bevor the metering of the monomers M is started.

It has been found advantageous to perform the free-radical emulsion polymerisation in the presence of a seed latex. A seed latex is a polymer latex which is present in the aqueous polymerisation medium before the metering of the monomers M is started.

The seed latex may help to better adjust the particle size or the final polymer latex obtained in the free-radical emulsion polymerisation of the invention.

Hence, particular preference is given to an aqueous polymer latex according to the present invention, which is obtainable by an aqueous emulsion polymerisation of monomers M in the presence of a seed latex. The amount of seed latex used for this purpose is usually in the range of 0.005 to 0.5%, preferably in the range of 0.01 to 0.4% by weight, more preferably in the range of 0.015 to 0.35% and in particular in the range of 0.02 to 0.3% by weight, based of the total weight of the monomers M and calculated as polymer solids of the seed latex.

Principally, every polymer latex may serve as a seed latex. For the purpose of the invention, preference is given to seed latices, where the Z-average particle diameter of the polymer particles of the seed latex, as determined by dynamic light scattering at 20° C. (see above) is preferably in the range from 10 to 100 nm, in particular form 10 to 60 nm. Preferably, the polymer particles of the seed latex is made of ethylenically unsaturated monomers, which comprise at least 95% by weight, based on the total weight of the monomers forming the seed latex, of one or more monomers M1 as defined above. In the polymer particles of the seed latex particular comprise at least 95% by weight, based on the total weight of the monomers forming the seed latex, of at least one monomer M1a or of a mixture of at least one monomer M1a and one or more monomers M1b, where the proportion of monomers M1a to M1b is at least 50% on a weight basis. A specifically preferred seed latex is polystyrene latex.

Typically, the seed latex, if used, is charged into the polymerisation vessel before the metering of the monomers M is started. In particular, the seed latex is charged into the polymerisation vessel followed by establishing the polymerisation conditions and charging at least a portion of the free-radical initiator into the polymerisation vessel before the metering of the monomers M is started.

The process for producing the polymer latex of the present invention may be a single stage polymerisation or a multistage emulsion polymerisation. In a single stage polymerisation, the overall composition of the monomers M, which are fed to the polymerisation reaction under polymerisation conditions, typically remains the same or almost the same. However, it is also possible to gradually change the overall composition of the monomers M over the feeding duration. On the other hand, in a multistage emulsion polymerisation, the overall composition of the monomers M, which are fed to the polymerisation reaction under polymerisation conditions, is altered abruptly at least once, in particular such that the first portion of the monomers M, herein named monomers Ma, which is polymerized in the initial stage of polymerisation has a different composition than the second portion of the monomers M, herein named monomers Mb, that is polymerized in the second stage of polymerisation.

It is apparent to the skilled person that the polymer latex according to the aforementioned group 1 of embodiments, where the functional monomers M2 and M3 are evenly or almost evenly distributed in polymerized form within the polymer particles, can be obtained with a single stage polymerisation process, by feeding under polymerisation conditions a composition of the monomers M to the polymerisation reaction that does not or only slightly change during the duration of the feeding, i.e. the concentrations of monomers M1, M2, M3 and possibly further monomers in the composition remain largely unchanged.

It is also apparent to the skilled person that the aforementioned aqueous polymer latex of the present invention, where the copolymerized functional monomers M2 and/or M3 are unevenly distributed in copolymerized form within the polymer particles can be obtained by changing the concentration of the monomers M2 and/or M3 accordingly during the course of the emulsion polymerisation. For example, in order to prepare a latex, in which the polymerized monomers M3 are mainly located on or close to the surface of the polymer particles, the concentration of monomers M3, i.e. the amount of the monomers M3 relative to the total weight of monomers M, should be low for most of the duration of the polymerisation and become significantly higher only in the final phase of the polymerisation. This can be accomplished for instance with a single stage polymerisation, by feeding the monomers M during the polymerisation in a gradient mode, where the concentration of the monomers M3 in the feed is increased after the addition of a major part of the total amount of monomers M and then maintained at a high level until the end of the feeding period.

Therefore, a polymer latex according to the aforementioned group 3' of embodiments, where the copolymerized monomers M3 and M2 are located predominantly on the surface or close to the surface and in the interior of the polymer particles, respectively, can be prepared with a single stage polymerisation. This can be done by using a feed of monomers M that includes a first gradient providing for at least 80% by weight, especially at least 90% by weight, of the monomers M2 to be fed together with the initial 65 to 90% by weight, especially 70 to 80% by weight, of the total weight of monomers M, and a second gradient providing for at least 80% by weight, especially at least 90% by weight, of the monomers M3 to be fed together with the remainder of monomers M. As apparent to a skilled person, the polymer latexes of the aforementioned group 2 of embodiments, where the copolymerized monomers M2 and M3 are located predominantly on the surface or close to the surface and in the inner area around the center of the polymer particles, respectively, as well as of the aforementioned group 3 of embodiments, where the copolymerized monomers M3 are located predominantly on the surface or close to the surface of the polymer particles, can be prepared in analogous fashion.

However, the aqueous polymer latex of the present invention is preferably prepared by a multistage emulsion polymerisation, such as in particular a two-stage emulsion polymerisation, i.e. the composition of the monomers fed to the polymerisation reaction under polymerisation conditions is abruptly altered once at a certain point in time during the polymerisation process.

Thus, the polymer latex according to the aforementioned group 2 of embodiments can be obtained with a two-stage emulsion polymerisation, which comprises a) a first stage, wherein monomers Ma are subjected to an emulsion polymerisation, where the monomers Ma comprise 40 to 85%, preferably 40 to 60% and in particular 45 to 55% of the monomers M1 comprised in the monomers M, at least 70%, preferably at least 80% and in particular at least 90% of M3 comprised in the monomers M and not more than 20%, especially not more than 10% of the monomers M2 comprised in the monomers M;

b) a second stage b), where monomers Mb are subjected to an emulsion polymerisation in the aqueous polymer dispersion obtained in stage a), where the monomers Mb comprise the remainder of the monomers M1, M2 and M3 comprised in the monomers M.

In addition, the polymer latex according to the aforementioned group 3 of embodiments is preferably obtained with a two-stage emulsion polymerisation, which comprises a) a first stage, wherein monomers Ma are subjected to an emulsion polymerisation, where the monomers Ma comprise 60 to 95%, preferably 65 to 85% and in particular 70 to 80% of the monomers M1 comprised in the monomers M, optionally monomers M2 comprised in the monomers M and not more than 20%, especially not more than 10% of the monomers M3 comprised in the monomers M;

b) a second stage b), where monomers Mb are subjected to an emulsion polymerisation in the aqueous polymer dispersion obtained in stage a), where the monomers Mb comprise the remainder of the monomers M1, M2 and M3 comprised in the monomers M.

The polymer latex according to the aforementioned group 3' of embodiments is in particular obtained with a two-stage emulsion polymerisation, which comprises c) a first stage, wherein monomers Ma are subjected to an emulsion polymerisation, where the monomers Ma comprise 60 to 95%, preferably 65 to 85%, more preferably 70 to 80% and in particular 72.5 to 77.5% of the monomers M1 comprised in the monomers M, at least 80%, preferably at least 85%, more preferably at least 90% and in particular at least 95% of monomers M2 comprised in the monomers M and not more than 20%, preferably not more than 10% and especially not more than 5% of the monomers M3 comprised in the monomers M;

d) a second stage b), where monomers Mb are subjected to an emulsion polymerisation in the aqueous polymer dispersion obtained in stage a), where the monomers Mb comprise the remainder of the monomers M1, M2 and M3 comprised in the monomers M.

The conditions required for the performance of the emulsion polymerisation of the monomers M are sufficiently familiar to those skilled in the art, for example from the prior art cited at the outset and from "Emulsionspolymerisation" [Emulsion Polymerisation] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE 4003422 A and Dispersionen synthetischer Hochpolymerer [Dispersions of Synthetic High Polymers], F. Hölscher, Springer-Verlag, Berlin (1969)], EP 184091, EP 710680, WO 2012/130712 and WO 2016/04116.

The free-radically initiated aqueous emulsion polymerisation is triggered by means of a free-radical polymerisation initiator (free-radical initiator). These may, in principle, be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron (II) sulfate, iron (II) ammonium sulfate, iron (II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 to 3 pphm, preferably 0.1 to 2 pphm.

The amount of free-radical initiator required in the process of the invention for the emulsion polymerisation can be initially charged in the polymerisation vessel completely. However, it is preferred to charge none of or merely a portion of the free-radical initiator, for example not more than 30% by weight, especially not more than 20% by weight, based on the total amount of the free-radical initiator required in the aqueous polymerisation medium and then, under polymerisation conditions, during the free-radical emulsion polymerisation of the monomers M to add the entire amount or any remaining residual amount, according to the consumption, batchwise in one or more portions or continuously with constant or varying flow rates.

The free-radical aqueous emulsion polymerisation of the invention is usually conducted at temperatures in the range from 0 to +170° C. Temperatures employed are frequently in the range from +50 to +120° C., in particular in the range from +60 to +120° C. and especially in the range from +70 to +110° C.

The free-radical aqueous emulsion polymerisation of the invention can be conducted at a pressure of less than, equal to or greater than 1 atm (atmospheric pressure), and so the polymerisation temperature may exceed +100° C. and may be up to +170° C. Polymerisation of the monomers is normally performed at ambient pressure, but it may also be performed under elevated pressure. In this case, the pressure may assume values of 1.2, 1.5, 2, 5, 10, 15 bar (absolute) or even higher values. If emulsion polymerisations are conducted under reduced pressure, pressures of 950 mbar, frequently of 900 mbar and often 850 mbar (absolute) are established. Advantageously, the free-radical aqueous emulsion polymerisation of the invention is conducted at ambient pressure (about 1 atm) with exclusion of oxygen, for example under an inert gas atmosphere, for example under nitrogen or argon.

The polymerisation of the monomers M can optionally be conducted in the presence of chain transfer agents. Chain transfer agents are understood to mean compounds that transfer free radicals, and which reduce the molecular weight of the growing chain and/or which control chain growth in the polymerisation. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2 pentanethiol, 3-pentanethiol, 2-methyl-2-butanethiol, 3-methyl-2-butanethiol, n hexanethiol, 2-hexanethiol, 3-hexanethiol, 2-methyl-2-pentanethiol, 3-methyl-2 pentanethiol, 4-methyl-2-pentanethiol, 2-methyl-3-pentanethiol, 3-methyl-3 pentanethiol, 2-ethylbutanethiol, 2-ethyl-2-butanethiol, n-heptanethiol and the isomeric compounds thereof, n-octanethiol and the isomeric compounds thereof, n nonanethiol and the isomeric compounds thereof, n-decanethiol and the isomeric compounds thereof, n-undecanethiol and the isomeric compounds thereof, n dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkyl esters of mercaptoacetic acid (thioglycolic acid), such as 2-ethylhexyl thioglycolate, alkyl esters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene.

Alternatively, it is possible to use mixtures of the aforementioned chain transfer agents that do not disrupt one another. The total amount of chain transfer agents optionally used in the process of the invention, based on the total amount of monomers M, will generally not exceed 2% by weight, in particular 1% by weight. However, it is possible that during a certain period of the polymerisation reaction the amount of chain transfer agent added to the polymerisation reaction may exceed the value of 2% by weight and may be as high as 8% by weight, in particular at most 4% by weight, based on the total amount of monomers M added to the polymerisation reaction during said period.

It is frequently advantageous when the aqueous polymer dispersion obtained on completion of polymerisation of the monomers M is subjected to a post-treatment to reduce the residual monomer content. This post-treatment is effected either chemically, for example by completing the polymerisation reaction using a more effective free-radical initiator system (known as post-polymerisation), and/or physically, for example by stripping the aqueous polymer dispersion with steam or inert gas. Corresponding chemical and physical methods are familiar to those skilled in the art, for example from EP 771328 A, DE 19624299 A, DE 19621027 A, DE 19741184 A, DE 19741187 A, DE 19805122 A, DE 19828183 A, DE 19839199 A, DE 19840586 A and DE 19847115 A. The combination of chemical and physical post-treatment has the advantage that it removes not only the unconverted ethylenically unsaturated monomers, but also other disruptive volatile organic constituents (VOCs) from the aqueous polymer dispersion.

Furthermore, it might be suitable to formulate the polymer latex of the invention with a post-curing agent. Ideally, such a post-curing agent, also termed as post-crosslinking agent, will result in a crosslinking reaction during and/or after film formation by forming coordinative or covalent bonds with reactive sites on the surface of the polymer particles.

Crosslinking agents, which are suitable for providing post crosslinking, are for example compounds having at least two functional groups selected from oxazoline, amino, aldehyde, aminoxy, carbodiimide, aziridinyl, epoxy and hydrazide groups, derivatives or compounds bearing acetoacetyl groups. These crosslinkers react with reactive sites of the polymers of the polymer dispersion, which bear complementary functional groups in the polymer, which are capable of forming a covalent bond with the crosslinker. Suitable systems are known to skilled persons.

If the polymers in the polymer dispersion bear carboxyl groups, e.g. by using an acidic monomer M4 carrying a carboxyl group, such as (meth)acrylic acid, post-crosslinking can be achieved by formulation of the polymer dispersion with one or more polycarbodiimides as described in U.S. Pat. Nos. 4,977,219, 5,047,588, 5,117,059, EP 0277361, EP 0507407, EP 0628582, U.S. Pat. No. 5,352,400, US 2011/0151128 and US 2011/0217471. It is assumed that crosslinking is based on the reaction of the carboxyl groups of the polymers with polycarbodiimides. The reaction typically results in covalent crosslinks, which are predominantly based on N-acyl urea bounds (J. W. Taylor and D. R. Bassett, in E. J. Glass (Ed.), Technology for Waterborne Coatings, ACS Symposium Series 663, Am. Chem. Soc., Washington, DC, 1997, chapter 8, pages 137 to 163).

Likewise, in case the polymer particles contained in the polymer dispersion of the present invention bear carboxyl groups stemming from monomers M4, a suitable post-curing agent may also be a water-soluble or water-dispersible polymer bearing oxazoline groups, e.g. the polymers as described in U.S. Pat. No. 5,300,602 and WO 2015/197662.

Post-crosslinking may possibly be also achievable by analogy to EP 1227116, which describes aqueous two-component coating compositions containing a binder polymer with carboxylic acid and hydroxyl functional groups and a polyfunctional crosslinker having functional groups selected from isocyanate, carbodiimide, aziridinyl and epoxy groups.

If the polymer in the polymer dispersion bears a keto group, e.g. by using a monomer M5, such as diacetone acrylamide (DAAM), post-crosslinking can be achieved by formulating the aqueous polymer dispersion with one or more dihydrazides, in particular aliphatic dicarboxylic acid, such as adipic acid dihydrazide (ADDH), as described in U.S. Pat. No. 4,931,494, US 2006/247367 and US 2004/143058. These components react basically during and after film formation, although a certain extent of preliminary reaction can occur.

Other suitable agents of achieving post-curing include

- epoxysilanes to crosslink carboxy groups in the polymer;
- dialdehydes, such as glyoxal to crosslink urea groups or acetoacetoxy groups, such as those derived from the monomers M5, respectively, as defined herein, in particular ureido (meth)acrylate or acetoacetoxyethyl (meth)acrylate;

Suitable systems are e.g. described in EP 0789724, U.S. Pat. Nos. 5,516,453 and 5,498,659.

The present invention also relates to waterborne coating compositions, which contain a binder polymer in the form of the aqueous polymer latex of the present invention and at least one inorganic pigment and/or filler. These waterborne coating compositions or latex paints of the invention may contain at least one inorganic pigment, which imparts a white shade or a color to the coating obtained when using the waterborne coating composition for coating substrates. Particular preference is given here to waterborne coating compositions, which contain at least one inorganic pigment and in addition at least one filler. However, waterborne coating compositions, which do not contain pigments, but only one or more fillers are also preferred.

Pigments for the purposes of the present invention are virtually insoluble, finely dispersed, organic or preferably inorganic colorants as per the definition in German standard specification DIN 55944:2003-11. Examples of pigments are in particular inorganic pigments, such as white pigments like titanium dioxide (C.I. Pigment White 6), but also color pigments, e.g.

- black pigments, such as iron oxide black (C.I. Pigment Black 11), iron manganese black, spinel black (C.I. Pigment Black 27), carbon black (C.I. Pigment Black 7);
- color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read, iron oxide brown, mixed brown, spinel- and Korundum phases (C.I. Pigment Brown 24, 29 und 31), chrome orange;
- iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);
- interference pigments, such as metallic effect pigments based on coated metal platelets, pearl luster pigments based on mica platelets coated with metal oxide, and liquid crystal pigments.

As mentioned above, the waterborne coating compositions, in particular the waterborne paints of the invention may also contain one or more fillers. Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers or do not comprise any fillers. Fillers also include flatting agents, which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

In a preferred group of embodiments of the invention, the waterborne coating compositions contain one or more fillers and optionally one or more pigments. In this group of embodiments, the amount of pigments may be 0% by weight, but is frequently at least 2% by weight, e.g. in the range of 2 to 20% by weight, based on the total weight of the coating composition. Preferably, the weight ratio of total amount of pigments to the total amount of fillers will frequently not exceed 1:1 and will preferably be in the range from 0:1 to 1:1, in particular in the range form 0.1:1 to 0.8:1.

The proportion of the pigments and fillers with respect to the amount of binder in the waterborne coating compositions can be described in a manner known per se via the pigment volume concentration (PVC), as mentioned previously. The PVC describes the ratio of the volume of pigments (VP) and fillers (VF) relative to the total volume, consisting of the volumes of binder (VB), pigments (VP) and fillers (VF) in a dried coating film in percent: $PVC=(VP+VF)\times 100/(VP+VF+VB)$.

The latex paints of the present invention usually have a pigment volume concentration (PVC) of at least 50%, preferably of at least 60%, especially of at least 70% and is frequently in the range of 50 to 95%, particularly in the range of 60 to 90% and specifically in the range of 70 to 85%.

The waterborne coating compositions of the invention are preferably designed as a paint containing a white pigment—that is, they comprise at least one white pigment and optionally one or more fillers. As white pigment they include, in particular, titanium dioxide, preferably in the rutile form, typically in combination with one or more fillers. With particular preference, the coating compositions of the invention comprise a white pigment, more particularly titanium dioxide, preferably in the rutile form, in combination with one or more fillers, such as chalk, talc or mixtures thereof, for example. Instead of or in combination with titanium dioxide other white pigments may be suitable, including e.g. zinc oxide or barium sulfate and combinations thereof.

The waterborne coating compositions of the present invention may further comprise a rheology modifying agent. Suitable rheology modifying agents include associative thickener polymers and non-associative rheology modifiers.

Associative thickener polymers are well known and frequently described in the scientific literature, e.g. by E. J. Schaller et al., "Associative Thickeners" in Handbook of Coating Additives, Vol. 2 (Editor L. J. Calbo), Marcel Decker 192, pp. 105-164, J. Bieleman "PUR-Verdicker" in Additives for Coatings (Editor J. Bielemann), Wiley 2000, pp 50-58. NiSAT thickener polymers of the HEUR and HMPE type are also described in the patent literature, such as U.S. Pat. Nos. 4,079,028, 4,155,892, EP 61822, EP 307775, WO 96/31550, EP 612329, EP 1013264, EP 1541643, EP 1584331, EP 2184304, DE 4137247, DE 102004008015, DE 102004031786, US 2011/0166291 and WO 2012/052508. Apart from that, associative thickener polymers are commercially available.

The associative thickener polymers include anionic, acrylate type thickener polymers, so-called HASE polymers (hydrophobically modified polyacrylate thickeners), which are copolymers of acrylic acid and alkyl acrylate monomers, where the alkyl group of the alkyl acrylate may have from 6 to 24 carbon atoms. The associative thickener polymers also include non-ionic associative thickeners, so called NiSAT thickeners (non-ionic synthetic associative thickeners), which usually are linear or branched block copolymers having at least one interior hydrophilic moiety, in particular a polyether moiety, especially at least one polyethylene oxide moiety and two or more terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms. NiSAT thickeners include the hydrophobically modified polyethylene oxide urethane rheology modifiers, also termed HEUR or PUR thickeners, and hydrophobically modified polyethyleneoxides, which are also termed HMPE.

The amount of the associative thickener polymer will depend on the desired viscosity profile and is frequently in the range from 0.05 to 2.5% by weight, in particular 0.1 to 2% by weight of thickener, and especially 0.2 to 2% by weight, based on the waterborne coating compositions.

Suitable non-associative rheology modifiers are in particular cellulose based thickeners, especially hydroxyethyl cellulose, but also thickeners based on acrylate emulsions (ASE). Amongst the non-associative rheology modifiers preference is given to non-associative cellulose based thickeners.

The total amount of the thickener polymer will depend on the desired viscosity profile and is frequently in the range from 0.05 to 2.5% by weight, in particular 0.1 to 2% by weight of thickener, and especially 0.15 to 1.5% by weight, based on the waterborne coating composition.

The aqueous coating compositions of the invention may also comprise customary auxiliaries. The customary auxiliaries will depend from the kind of the coating in a well-known manner and include but are not limited to:

wetting agents or dispersants,
filming auxiliaries, also termed coalescents,
leveling agents,
biocides and
defoamers.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are solvents and plasticizers. Plasticizers, in contrast to solvents, have a low volatility and preferably have a boiling point at 1013 mbar of higher than 250° C., while solvents have a higher volatility than plasticizers and preferably have a boiling point at 1013 mbar of less than 250° C. Suitable filming auxiliaries are, for example, white spirit, pine oil, propylene glycol, ethylene glycol, butyl glycol, butyl glycol acetate, butyl glycol diacetate, butyl diglycol, butylcarbitol, 1-methoxy-2-propanol, 2,2,2-trimethyl-1,3-pentanediol monoisobutyrate (Texanol®) and the glycol ethers and esters, commercially available, for example, from BASF SE under the Solvenon® and Lusolvan® and Loxanol® names, and from Dow under the Dowanol® trade name. The amount is preferably <5% by weight and more preferably <1% by weight, based on the overall formulation. Formulation is also possible completely without filming auxiliaries. If the coating compositions contain filming auxiliaries, these are preferably selected from plasticizers. Frequently, the coating compositions do not require any filming auxiliaries.

Further suitable auxiliaries and components are e.g. described by J. Bieleman in "Additives for Coatings", Whiley-VCH, Weinheim 2000; by T. C. Patton in "Paint Flow and Pigment Dispersions", 2nd Edition, John Whiley & Sons 1978; and by M. Schwartz and R. Baumstark in "Water based Acrylates for Decorative Coatings", Curt R. Vincentz Verlag, Hanover 2001.

The waterborne coating compositions of the invention preferably do not contain any volatile organic compound. In case that volatile organic compounds are present, the concentration of said compounds is usually below 0.2 wt.-%, preferably below 0.1 wt.-%, more preferably below 0.05 wt.-%, based on the total amount of the waterborne coating composition. A volatile compound in terms of the invention is a compound, which has a boiling point at 1013 mbar of less than 250° C.

The latex paints of the invention can be produced in a manner known per se by blending the components in mixing apparatuses customary for the purpose.

The latex paints are used for coating surfaces, in particular for interior or exterior walls or ceilings. The latex paint may be applied to substrates to be coated in a customary manner, for example by applying the paint with brushes or rollers, by spraying, by dipping, by rolling, or by bar coating to the desired substrate. Preferred applications are by brush and/or by roller.

Usually, the coating of substrates is effected in such a way that the substrate is first coated with a waterborne coating composition of the invention, and then the thus obtained aqueous coating is subjected to a drying step, especially within the temperature range of ≥0 and ≤+50° C., advantageously ≥+5 and ≤+40° C.

The polymer latexes of the present invention allow for the preparation of highly pigment and/or filler loaded latex paints, which are nonetheless stable over extended storage periods and do not have a tendency to grit formation. The latex paints are therefore particularly suitable for interior applications. Moreover, the coatings obtained by using a latex paint of the invention coating composition of the invention do not only feature good hiding power/opacity but also high wet scrub resistance.

The invention is to be illustrated by the following non-limiting examples.

EXAMPLES

1. Analytics of the Polymer Latexes 1.1. Solids Content

Solids content was determined by spreading 0.5 to 1.5 g wet polymer latex in a sample vessel with a diameter of 4 cm and drying of the latex using a moisture analyzer (device HR 83 form Mettler-Toledo GmbH, Germany) at a temperature of 140° C. until a constant mass was reached. The ratio of the mass after drying to the mass before drying gave the solids content of the polymer latex.

1.2. Coagulum Formed During Polymerisation

After completion of the polymerisation the obtained polymer latex was filtered through a nylon filter with a 125 μm mesh size, and the solid filter content was weighed. The weight of the filter content in relation to total mass of obtained wet polymer latex gave the proportion of coagulum in % by weight.

1.3 Particle Diameter

The volume-based particle size distributions of the polymer latexes were measured by capillary hydrodynamic fractionation (HDC) with a "CHDF3000" device (from Matec Applied Sciences, USA) using as column a "PL-PSDA cartridge, Type-2" (Agilent Technologies, USA). Each sample was first diluted to a solids content of 1% by weight, filtered through a filter with pore size 1.2 μm and injected with an autosampler with an injection volume of 25 μL.

For some polymer latexes, volume-based particle size distributions of the polymer latexes were measured by dynamic light scattering (DLS) as described above, using a Malvern Panalytical Zetasizert HPPS.

2. Starting Materials for Preparing Polymer Latexes

Emulsifier 1: 28% by weight aqueous solution of anionic surfactant of general formula $RO(CH_2CH_2O)_xSO_3Na$ with $R{=}C_{12}C_{14}$ and an average x of 2.

Seed latex 1: 33% by weight of an aqueous polystyrene latex having a Z average particle diameter of about 30 nm measured with HPPS.

Phosphate Monomer 1: mono-methacryl(oxy-1,2-ethanediyl) 2-10 phosphate (Sipomer PAM 100 from Solvay Chemicals, Belgium).

Phosphate Monomer 2: mono-methacryl(oxy-1,2-propandiyl) 2-10 phosphate (Sipomer PAM 200 from Solvay Chemicals, Belgium).

Phosphate Monomer 3: mono-methacryloxyethyl phosphate (Sipomer PAM 4000 from Solvay Chemicals, Belgium).

3. Ingredients of the Coating Compositions

Dispersant: 35% by weight aqueous solution of the sodium salt of a polyacrylic acid (Dispex AA 4145, BASF SE)

Defoamer: Polymer emulsion containing silicone (Foamstar ED 2523)

Thickener: Methyl hydroxyethyl cellulose (Tylose MH 30000 YP4, Shin-Etsu Chemical).

Polyphosphate: Sodiumhexametaphosphate (Calgon N of ICL)

$TiO_2$-Pigment: Rutile type $TiO_2$ pigment (Kronos 2044, Kronos B.V.)

Filler 1: Kaolin (China Claim B)

Filler 2: Calcium carbonate with a particle size (d50) of 2 μm (Omyacarb 2 GU, Omya GmbH)

Filler 3: Calcium carbonate with a particle size (d50) of 6.0 μm (Omyacarb 5 GU, Omya GmbH)

4. Preparation of Polymer Latexes 4.1 Example 1

A polymerisation vessel equipped with metering units and closed-loop temperature control was initially charged at 20 to 25° C. under a nitrogen atmosphere with the Precharge 1 and then heated to 85° C. while stirring. On attainment of this temperature, 7.86 g of Feed 3 were added, and the mixture was stirred at 85° C. for further 5 minutes. Then, while maintaining the temperature, simultaneously Feed 1 and the remainder of Feed 3 were started. Feed 1 was metered at constant feed rate into the reaction vessel within 113 minutes and Feed 3 was metered at constant feed rate into the reaction vessel within 180 minutes, while stirring was continued, and the temperature of 80° C. was maintained. Right after the end of feeding Feed 1, Feed 2 was metered at constant feed rate into the reaction vessel within 37 minutes. After having metered Feed 3 completely into the reaction vessel, rinse water 1 was added, and stirring at 85° C. was continued for 25 minutes. Then, Feed 4 and Feed 5 were started simultaneously and metered into the reaction vessel within 120 minutes, while maintaining the temperature of 85° C. 90 minutes after start of Feed 4 and Feed 5, Feed 6 was metered at constant feed rate into the reaction vessel within 30 minutes.

Precharge 1:

| | |
|---|---|
| 184.14 g | deionized water |
| 0.83 g | Seed latex 1 |

Feed 1 (an emulsion comprising):

| | |
|---|---|
| 179.75 g | deionized water |
| 14.73 g | Emulsifier 1 |
| 182.55 g | Styrene |
| 164.01 g | n-Butyl acrylate |
| 64.85 g | 2-Ethylhexyl acrylate |
| 1.10 g | Methacryloxypropyltrimethoxysilane |

Feed 2 (an emulsion comprising):

| | |
|---|---|
| 58.19 g | deionized water |
| 4.91 g | Emulsifier 1 |
| 55.72 g | Styrene |
| 54.76 g | n-Butyl acrylate |
| 21.62 g | 2-Ethylhexyl acrylate |
| 5.50 g | Phosphate Monomer 1 |

Feed 3 (a homogeneous solution comprising):

| | |
|---|---|
| 29.23 g | deionized water and |
| 2.20 g | sodium peroxodisulfate |

Rinse water 1:

| | |
|---|---|
| 9.41 g | deionized water |

Feed 4:

| | |
|---|---|
| 16.50 g | 10% by weight aqueous solution of tert-butyl hydroperoxide |

Feed 5:

| | |
|---|---|
| 13.44 g | 13.1% by weight aqueous solution of acetone bisulfite |

Feed 6:

| | |
|---|---|
| 19.36 g | 10% by weight aqueous solution of sodium hydroxide (amount may vary, adjustment to pH 6-8) |

The obtained polymer latex was cooled to ambient temperature and filtered through a 125 μm filter to remove coagulum. Thereby, around 1080 g of an aqueous polymer latex was obtained. The solid content of the polymer latex was 50.8%, the proportion of coagulum amounted to 0.2% by weight, and the pH value of the polymer latex was found to be 6.8. Upon dilution with deionized water, the resulting aqueous polymer had a volume median particle diameter of 355 nm according to HDC (338 nm according to DLS).

4.2 Comparative Example C2

Example 1 was repeated with the exception that the following Precharge 1 was used:

Precharge 1:

| | |
|---|---|
| 185.77 g | deionized water |
| 11.00 g | Seed latex 1 |

The solid content of the obtained polymer latex was 50.9% and the proportion of coagulum amounted to 2.9% by weight (dry on dispersion). Upon dilution with deionized water, the resulting aqueous polymer had a volume median particle diameter of 152 nm according to HDC (151 nm according to DLS).

4.3 Example 3

Example 1 was repeated with the exception that the following Precharge 1 was used:

Precharge 1:

| | |
|---|---|
| 189.02 g | deionized water |
| 2.00 g | Seed latex 1 |

The solid content of the obtained polymer latex was 51.5% and the proportion of coagulum amounted to 0.3% by weight (dry on dispersion). Upon dilution with deionized water, the resulting aqueous polymer had a volume median particle diameter of 268 nm according to HDC (257 nm according to DLS).

4.4 Example 4

Example 1 was repeated with the exception that the following Precharge 1 was used:

Precharge 1:

| | |
|---|---|
| 183.81 g | deionized water |
| 1.67 g | Seed latex 1 |

The solid content of the obtained polymer latex was 52.0% and the proportion of coagulum amounted to 0.3% by weight (dry on dispersion). Upon dilution with deionized water, the resulting aqueous polymer had a volume median particle diameter of 279 nm according to HDC (270 nm according to DLS).

4.5 Example 5

Example 1 was repeated with the exception that the following Precharge 1 was used:

Precharge 1:

| | |
|---|---|
| 184.17 g | deionized water |
| 0.67 g | Seed latex 1 |

The solid content of the obtained polymer latex was 51.6% and the proportion of coagulum amounted to 0.2% by weight (dry on dispersion). Upon dilution with deionized water, the resulting aqueous polymer had a volume median particle diameter of 371 nm according to HDC.

4.6 Example 6

Example 1 was repeated with the exception that the following Precharge 1 was used:

Precharge 1:

| | |
|---|---|
| 184.27 g | deionized water |
| 0.42 g | Seed latex 1 |

The solid content of the obtained polymer latex was 51.2% and the proportion of coagulum amounted to 0.2% by weight (dry on dispersion). Upon dilution with deionized water, the resulting aqueous polymer had a volume median particle diameter of 409 nm according to HDC.

4.7 Example 7

Example 1 was repeated with the exception that the following Precharge 1 was used:

Precharge 1:

| | |
|---|---|
| 184.41 g | deionized water |
| 6.02 g | of feed 1. |

Accordingly, the amount of Feed 1 fed during the polymerisation was reduced by 6.02 g.

The solid content of the obtained polymer latex was 51.3% and the proportion of coagulum amounted to 0.1% by weight (dry on dispersion). Upon dilution with deionized water, the resulting aqueous polymer had a volume median particle diameter of 471 nm according to HDC.

4.8 Comparative Example C8

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 61.22 | g | Styrene |
| 54.67 | g | n-Butyl acrylate |
| 21.62 | g | 2-Ethylhexyl acrylate |

The solid content of the obtained polymer latex was 48.8% and the proportion of coagulum amounted to 0.9% by weight (dry on dispersion). Upon dilution with deionized water, the resulting aqueous polymer had a volume median particle diameter of 336 nm according to HDC.

4.9 Example 9

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 58.47 | g | Styrene |
| 54.67 | g | n-Butyl acrylate |
| 21.62 | g | 2-Ethylhexyl acrylate |
| 2.75 | g | Phosphate Monomer 1 |

The solid content of the obtained polymer latex was 51.7% and the proportion of coagulum amounted to 0.2% by weight (dry on dispersion). Upon dilution with deionized water, the resulting aqueous polymer had a volume median particle diameter of 331 nm according to HDC.

4.10 Example 10

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 57.09 | g | Styrene |
| 54.67 | g | n-Butyl acrylate |
| 21.62 | g | 2-Ethylhexyl acrylate |
| 4.13 | g | Phosphate Monomer 1 |

The solid content of the obtained polymer latex was 51.7% and the proportion of coagulum amounted to 0.2% by weight (dry on dispersion). Upon dilution with deionized water, the resulting aqueous polymer had a volume median particle diameter of 336 nm according to HDC.

4.11 Example 11

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 56.27 | g | Styrene |
| 54.67 | g | n-Butyl acrylate |
| 21.62 | g | 2-Ethylhexyl acrylate |
| 4.95 | g | Phosphate Monomer 1 |

The solid content of the obtained polymer latex was 51.0% and the proportion of coagulum amounted to 0.4% by weight (dry on dispersion). Upon dilution with deionized water, the resulting aqueous polymer had a volume median particle diameter of 314 nm according to HDC.

4.12 Example 12

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 55.17 | g | Styrene |
| 54.67 | g | n-Butyl acrylate |
| 21.62 | g | 2-Ethylhexyl acrylate |
| 6.05 | g | Phosphate Monomer 1 |

The solid content of the obtained polymer latex was 51.0% and the proportion of coagulum amounted to 0.2% by weight (dry on dispersion). Upon dilution with deionized water, the resulting aqueous polymer had a volume median particle diameter of 341 nm according to HDC.

4.13 Example 13

Example 1 was repeated with the exception that the following Feed 2 was used:

Feed 2 (an emulsion comprising):

| | | |
|---|---|---|
| 58.19 | g | deionized water |
| 4.91 | g | Emulsifier 1 |
| 50.22 | g | Styrene |
| 54.67 | g | n-Butyl acrylate |
| 21.62 | g | 2-Ethylhexyl acrylate |
| 11.00 | g | Phosphate Monomer 1 |

The solid content of the obtained polymer latex was 50.2% and the proportion of coagulum amounted to 0.2% by weight (dry on dispersion). Upon dilution with deionized water, the resulting aqueous polymer had a volume median particle diameter of 339 nm according to HDC.

4.14 Example 14

Example 1 was repeated with the exception that the following Feeds 1 and 2 were used:

Feed 1 (an emulsion comprising):

| | | |
|---|---|---|
| 174.52 | g | deionized water |
| 14.73 | g | Emulsifier 1 |
| 178.42 | g | Styrene |
| 164.01 | g | n-Butyl acrylate |
| 64.85 | g | 2-Ethylhexyl acrylate |
| 1.10 | g | Methacryloxypropyltrimethoxysilane |
| 4.13 | g | Phosphate Monomer 1 |

Feed 2 (an emulsion comprising):

| | |
|---|---|
| 58.19 g | deionized water |
| 4.91 g | Emulsifier 1 |
| 59.84 g | Styrene |
| 54.67 g | n-Butyl acrylate |
| 21.62 g | 2-Ethylhexyl acrylate |
| 1.38 g | Phosphate Monomer 1 |

The solid content of the obtained polymer latex was 51.0% and the proportion of coagulum amounted to 0.6% by weight (dry on dispersion). Upon dilution with deionized water, the resulting aqueous polymer had a volume median particle diameter of 339 nm according to HDC.

4.15 Example 15

Example 1 was repeated with the exception that the following Feeds 1 and 2 were used:

Feed 1 (an emulsion comprising):

| | |
|---|---|
| 116.33 g | deionized water |
| 9.82 g | Emulsifier 1 |
| 119.34 g | Styrene |
| 109.34 g | n-Butyl acrylate |
| 43.23 g | 2-Ethylhexyl acrylate |
| 1.10 g | Methacryloxypropyltrimethoxysilane |

Feed 2 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |
| 5.50 g | Phosphate Monomer 1 |

The solid content of the obtained polymer latex was 51.5% and the proportion of coagulum amounted to 0.5% by weight (dry on dispersion). Upon dilution with deionized water, the resulting aqueous polymer had a volume median particle diameter of 333 nm according to HDC.

4.16 Example 16

Example 1 was repeated with the exception that the following Feeds 1 and 2 were used:

Feed 1 (an emulsion comprising):

| | |
|---|---|
| 58.19 g | deionized water |
| 4.91 g | Emulsifier 1 |
| 55.72 g | Styrene |
| 54.76 g | n-Butyl acrylate |
| 21.62 g | 2-Ethylhexyl acrylate |
| 5.50 g | Phosphate Monomer 1 |

Feed 2 (an emulsion comprising):

| | |
|---|---|
| 179.75 g | deionized water |
| 14.73 g | Emulsifier 1 |
| 182.55 g | Styrene |
| 164.01 g | n-Butyl acrylate |
| 64.85 g | 2-Ethylhexyl acrylate |
| 1.10 g | Methacryloxypropyltrimethoxysilane |

The solid content of the obtained polymer latex was 51.2% and the proportion of coagulum amounted to 0.4% by weight (dry on dispersion). Upon dilution with deionized water, the resulting aqueous polymer had a volume median particle diameter of 341 nm according to HDC.

4.17 Example 17

Example 1 was repeated with the exception that the following Feeds 1 and 2 were used:

Feed 1 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |
| 5.50 g | Phosphate Monomer 1 |

Feed 2 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |
| 1.10 g | Methacryloxypropyltrimethoxysilane |

The solid content of the obtained polymer latex was 50.8% and the proportion of coagulum amounted to 0.2% by weight (dry on dispersion). Upon dilution with deionized water, the resulting aqueous polymer had a volume median particle diameter of 328 nm according to HDC.

4.18 Example 18

Example 1 was repeated with the exception that the following Feeds 1 and 2 were used:

Feed 1 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |

Feed 2 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |
| 1.10 g | Methacryloxypropyltrimethoxysilane |
| 5.50 g | Phosphate Monomer 1 |

The solid content of the obtained polymer latex was 50.8% and the proportion of coagulum amounted to 0.1% by weight (dry on dispersion). Upon dilution with deionized water, the resulting aqueous polymer had a volume median particle diameter of 325 nm according to HDC.

4.19 Example 19

Example 1 was repeated with the exception that the following Feeds 1 and 2 were used:

Feed 1 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |
| 5.50 g | Phosphate Monomer 1 |
| 1.10 g | Methacryloxypropyltrimethoxysilane |

Feed 2 (an emulsion comprising):

| | |
|---|---|
| 116.33 g | deionized water |
| 9.82 g | Emulsifier 1 |
| 119.13 g | Styrene |
| 109.34 g | n-Butyl acrylate |
| 43.23 g | 2-Ethylhexyl acrylate |

The solid content of the obtained polymer latex was 50.7% and the proportion of coagulum amounted to 0.2% by weight (dry on dispersion). Upon dilution with deionized water, the resulting aqueous polymer had a volume median particle diameter of 331 nm according to HDC.

4.20 Example 20

Example 1 was repeated with the exception that the following Feed 1 was used:

Feed 1 (an emulsion comprising):

| | |
|---|---|
| 179.75 g | deionized water |
| 14.73 g | Emulsifier 1 |
| 179.80 g | Styrene |
| 164.01 g | n-Butyl acrylate |
| 64.85 g | 2-Ethylhexyl acrylate |
| 5.50 g | Acrylamide (50% solution) |
| 1.10 g | Methacryloxypropyltrimethoxysilane |

The solid content of the obtained polymer latex was 50.7% and the proportion of coagulum amounted to 0.3% by weight (dry on dispersion). Upon dilution with deionized water, the resulting aqueous polymer had a volume median particle diameter of 349 nm according to HDC.

4.21 Example 21

Example 1 was repeated with the exception that the following Feed 1 was used:

Feed 1 (an emulsion comprising):

| | |
|---|---|
| 179.75 g | deionized water |
| 14.73 g | Emulsifier 1 |
| 179.80 g | Styrene |
| 164.01 g | n-Butyl acrylate |
| 64.85 g | 2-Ethylhexyl acrylate |
| 2.48 g | Methacrylic acid |
| 1.10 g | Methacryloxypropyltrimethoxysilane |

The solid content of the obtained polymer latex was 51.5% and the proportion of coagulum amounted to 0.9% by weight (dry on dispersion). Upon dilution with deionized water, the resulting aqueous polymer had a volume median particle diameter of 339 nm according to HDC.

4.22 Comparative Example C22

Example 1 was repeated with the exception that the following feed 1 was used:

Feed 1 (an emulsion comprising):

| | |
|---|---|
| 179.75 g | deionized water |
| 14.73 g | Emulsifier 1 |
| 174.30 g | Styrene |
| 164.01 g | n-Butyl acrylate |
| 64.85 g | 2-Ethylhexyl acrylate |
| 8.25 g | Acrylic Acid |
| 1.10 g | Methacryloxypropyltrimethoxysilane |

The solid content of the obtained polymer latex was 50.1% and the proportion of coagulum amounted to 0.3% by weight (dry on dispersion). Upon dilution with deionized water, the resulting aqueous polymer had a volume median particle diameter of 344 nm according to HDC.

4.23 Example 23

Example 1 was repeated with the following exceptions i) and ii):

i) the following Feed 1 was fed within 150 minutes:

Feed 1 (an emulsion comprising):

| | |
|---|---|
| 232.65 g | deionized water |
| 19.64 g | Emulsifier 1 |
| 238.26 g | Styrene |
| 218.68 g | n-Butyl acrylate |
| 86.46 g | 2-Ethylhexyl acrylate |
| 5.50 g | Phosphate Monomer 1 |
| 1.10 g | Methacryloxypropyltrimethoxysilane |

ii) no Feed 2 was fed.

The solid content of the obtained polymer latex was 49.8% and the proportion of coagulum amounted to 0.2% by weight (dry on dispersion). Upon dilution with deionized water, the resulting aqueous polymer had a volume median particle diameter of 341 nm according to HDC.

4.24 Example 24

Example 1 was repeated with the exception that the following Feed 2 was used:

Feed 2 (an emulsion comprising):

| | |
|---|---|
| 58.19 g | deionized water |
| 4.91 g | Emulsifier 1 |
| 55.72 g | Styrene |
| 54.76 g | n-Butyl acrylate |
| 21.62 g | 2-Ethylhexyl acrylate |
| 5.50 g | Phosphate Monomer 3 |

The solid content of the obtained polymer latex was 50.1% and the proportion of coagulum amounted to 0.3% by weight (dry on dispersion). Upon dilution with deionized water, the resulting aqueous polymer had a volume median particle diameter of 349 nm according to HDC.

4.25 Example 25

Example 1 was repeated with the exception that the following Feed 2 was used:

Feed 2 (an emulsion comprising):

| | |
|---|---|
| 58.19 g | deionized water |
| 4.91 g | Emulsifier 1 |
| 58.26 g | Styrene |
| 54.76 g | n-Butyl acrylate |
| 21.62 g | 2-Ethylhexyl acrylate |
| 2.96 g | Phosphate Monomer 3 |

The solid content of the obtained polymer latex was 51.0% and the proportion of coagulum amounted to 0.3% by weight (dry on dispersion). Upon dilution with deionized water, the resulting aqueous polymer had a volume median particle diameter of 347 nm according to HDC.

4.26 Example 26

Example 1 was repeated with the exception that the following Feed 2 was used:

Feed 2 (an emulsion comprising):

| | |
|---|---|
| 58.19 g | deionized water |
| 4.91 g | Emulsifier 1 |
| 55.72 g | Styrene |
| 54.67 g | n-Butyl acrylate |
| 21.62 g | 2-Ethylhexyl acrylate |
| 5.50 g | Phosphate Monomer 2 |

The solid content of the obtained polymer latex was 50.6% and the proportion of coagulum amounted to 0.9% by weight (dry on dispersion). Upon dilution with deionized water, the resulting aqueous polymer had a volume median particle diameter of 347 nm according to HDC.

4.27 Example 27

Example 1 was repeated with the exception that the following Feed 2 was used:

Feed 2 (an emulsion comprising):

| | |
|---|---|
| 58.19 g | deionized water |
| 4.91 g | Emulsifier 1 |
| 54.31 g | Styrene |
| 54.67 g | n-Butyl acrylate |
| 21.62 g | 2-Ethylhexyl acrylate |
| 6.91 g | Phosphate Monomer 2 |

The solid content of the obtained polymer latex was 51.9% and the proportion of coagulum amounted to 0.3% by weight (dry on dispersion). Upon dilution with deionized water, the resulting aqueous polymer had a volume median particle diameter of 339 nm according to HDC.

4.28 Comparative Example C28

Example 1 was repeated with the exception that the following Feed 1 was used:

Feed 1 (an emulsion comprising):

| | |
|---|---|
| 174.52 g | deionized water |
| 14.73 g | Emulsifier 1 |
| 183.65 g | Styrene |
| 164.01 g | n-Butyl acrylate |
| 64.85 g | 2-Ethylhexyl acrylate |

The solid content of the obtained polymer latex was 52.1% and the proportion of coagulum amounted to 0.1% by weight (dry on dispersion). Upon dilution with deionized water, the resulting aqueous polymer had a volume median particle diameter of 320 nm according to HDC.

4.29 Example 29

Example 29 was prepared like Example 1, except that Feed 1 was changed to:

Feed 1 (emulsion of):

| | |
|---|---|
| 179.75 g | deionized water |
| 14.73 g | emulsifier solution 1 |
| 179.80 g | Styrene |
| 164.01 g | n-Butyl acrylate |
| 64.85 g | 2-Ethylhexyl acrylate |
| 2.48 g | Acrylic acid |
| 1.10 g | Methacryloxypropyltrimethoxysilan |

4.30 Example 30

Example 30 was prepared like Example 1, except that Feed 1 was changed to:

Feed 1 (emulsion of):

| | |
|---|---|
| 179.75 g | deionized water |
| 14.73 g | emulsifier solution 1 |
| 179.80 g | Styrene |
| 164.01 g | n-Butyl acrylate |
| 64.85 g | 2-Ethylhexyl acrylate |
| 2.48 g | Acrylamide |
| 1.10 g | Methacryloxypropyltrimethoxysilan |

5. Testing of Application Properties of Waterborne Coating Compositions

For testing the application properties of waterborne coating compositions containing the polymer latexes of examples 1, 3 to 7, 9 to 21 and 23 to 26 and of comparative examples C2, C8 and C22, paint formulations were formulated using the following recipe:

| | parts by weight |
|---|---|
| Water | 272 |
| Thickener | 4 |
| Sodium hydroxide (10% by weight in water) | 2 |
| Polyphosphate (10% by weight in water) | 5 |
| Dispersant | 3.5 |
| $TiO_2$ Pigment | 80 |
| Filler 1 | 35 |
| Filler 2 | 235 |
| Filler 3 | 205 |

The above mixture was dispersed for approx. 20 min. Then the following ingredients were added:

| | parts by weight |
|---|---|
| Defoamer | 2 |
| Aqueous polymer latex (50% by weight) | 132.5 |
| Water | 24 |
| Total | 1000 |

Properties of the paint formulation:

| | |
|---|---|
| PVC | approx 76% |
| Solids content | approx 62% |
| ICI Viscosity | approx 2.1 P |
| Stormer Viscosity | approx 109 KU |

5.1 Measurement of Opacity

Opacity, respectively hiding power, was quantified by spreading rate measurements. These measurements were performed by applying different film thicknesses using a draw-down bar i.e. doctor blade (e.g. 150, 200, 220 and 250 µm wet) onto a defined contrast paper, e.g. Leneta foil with black & white areas and subsequent measurement of contrast ratios. Afterwards, the values are interpolated to yield the so called spreading rate, which is the reciprocal of the volume of the paint per area [$m^2$/L] (inverse of the film thickness) which is required to cover a substrate at a given contrast ratio, e.g. 98% or 99.5%, for a Class II hiding paint according to ISO DIN 13300.

5.2 Measurement of Wet Scrub Resistance

The wet scrub resistance (WSR) of the latex paints prepared was tested by means of the nonwoven pad method in accordance to ISO 11998. WSR is assessed on the basis of the weight loss per unit area caused by abrasion and calculated back to an average thickness loss given in µm.

The results of these measurements 5.1 and 5.2 are summarized in the following Table 1. The waterborne coating compositions or latex paints P1, CP2, P3 to P7, CP8, P9 to P21, CP22 and P23 to P26 were prepared with the aqueous polymer latexes of examples 1, C2, 3 to 7, C8, 9 to 21, C22 and 23 to 26, respectively as binders.

TABLE 1

| Paint | Binder (Ex. No.) | Wet scrub resistance/µm | Spreading rate at contrast ratio: 98% | 99.5% | Comments |
|---|---|---|---|---|---|
| P1 | 1 | 10 | 7.7 | 4.4 | |
| CP2 | C2 | Complete removal of paint film | 7.9 | 4.8 | Very high coagulum build-up during polymerisation. Coating showed good opacity, but also extremely high abrasion. |
| P3 | 3 | 7 | 7.2 | 3.8 | |
| P4 | 4 | 7 | 6.8 | 3.9 | |
| P5 | 5 | 10 | 7.5 | 4.5 | |
| P6 | 6 | 9 | 7.3 | 4.4 | |
| P7 | 7 | 13 | 7.7 | 4.5 | |
| CP8 | C8 | Complete removal of paint film | 7.8 | 4.6 | Good opacity, but also very high abrasion. |
| P9 | 9 | 7 | 6.3 | 4.1 | |
| P10 | 10 | 6 | 6.8 | 3.6 | |
| P11 | 11 | 5 | 6.5 | 3.9 | |
| P12 | 12 | 7 | 6.9 | 4.3 | |
| P13 | 13 | 7 | 6.9 | 4.1 | Viscosity of the paint rose to extreme values after storage at 50° C. for 14 days. |
| P14 | 14 | 6 | 6.8 | 3.9 | |
| P15 | 15 | 9 | 7.0 | 4.5 | |
| P16 | 16 | 10 | 7.1 | 4.4 | |
| P17 | 17 | 11 | 7.5 | 4.5 | |
| P18 | 18 | 8 | 6.9 | 4.3 | |
| P19 | 19 | 9 | 7.3 | 4.5 | |
| P20 | 20 | 13 | 7.8 | 4.6 | |
| P21 | 21 | 6 | 7.0 | 3.9 | |
| CP22 | C22 | 15 | 8.1 | 4.1 | High abrasion |
| P23 | 23 | 11 | 7.2 | 4.1 | |
| P24 | 24 | 12 | 6.9 | 4.0 | |
| P25 | 25 | 10 | 7.0 | 3.7 | |
| P26 | 26 | 6 | 6.6 | 4.0 | |

From the results summarized in Table 1 it is apparent that the use of polymer latexes according to the invention as binders in latex paints results in coatings of excellent overall quality, characterized in particular by a good balance between high opacity and strong wet scrub resistance. Moreover, the polymer latexes of the invention are easy to produce and require and require only small amounts of the relative expensive functional monomers M2 and M3 bearing a hydrolysable silane or an acidic phosphate group.

The invention claimed is:

1. An aqueous polymer latex of film-forming copolymer particles, where the latex is obtainable by an aqueous emulsion polymerisation of ethylenically unsaturated monomers M, which comprise i) 90 to 99.85% by weight, based on the total weight of monomers M, of at least one monoethylenically unsaturated non-ionic monomer M1, which is selected from the group consisting of $C_1$-$C_{20}$-alkyl esters of acrylic acid, $C_5$-$C_{20}$-cycloalkylesters of acrylic acid, $C_1$-$C_{20}$-alkylesters of methacrylic acid, $C_5$-$C_{20}$-cycloalkylesters of methacrylic acid, and monovinyl aromatic hydrocarbon monomers and combinations thereof;

ii) 0.01 to 1% by weight, based on the total weight of monomers M, of at least one monoethylenically unsaturated monomer M2 having a hydrolysable silane group;

iii) 0.1 to 2% by weight, based on the total weight of monomers M, of at least one monoethylenically unsaturated monomer M3 having an acidic phosphate group, or a salt thereof;

where the monomers M do not comprise more than 1% by weight of ethylenically monomers selected from monomers M4, which bear an acidic group different from a phosphate group and salts thereof, and ethylenically unsaturated neutral monomers M5 having a solubility in water at 22° C. and 1 bar of at least 60 g/L, where the copolymer particles in the polymer latex have a volume median particle diameter in the range of 260 to 500 nm, as determined by dynamic light scattering according to the ISO 13321:1996 standard.

2. The aqueous polymer latex of claim 1, wherein the monomer M1 comprises at least 90% by weight, based on the total weight of monomers M, of a combination of at least one monovinyl aromatic hydrocarbon monomer as a monomer M1a and at least one $C_2$-$C_{12}$-alkyl ester of acrylic acid as a monomer M1b.

3. The aqueous polymer latex of claim 2, where the monomer M1a is styrene and where the monomer M1b is selected from the group consisting of n-butyl acrylate and 2-ethylhexylacrylate and combinations thereof.

4. The aqueous polymer latex of claim 1, wherein the monomer M2 is selected from the group consisting of vinyltrialkoxysilanes, acryloxyalkyltrialkoxysilanes and methacryloxyalkyltrialkoxysilanes.

5. The aqueous polymer latex of claim 1, wherein the monomer M3 is selected from the group consisting of monomers of the formula (I) and the salts thereof $$H_2C=C(R)-C(=O)-O-A-[O-Alk]_n-O-P(=O)(OH)_2 \quad (I)$$

wherein

A is $C_2$-$C_4$-alkandiyl,

Alk within the repeating unit $[Alk\text{-}O]_n$ is identical or different and 1,2-ethanediyl or 1,2-propandiyl, n is 0 or an integer from 1 to 20 and R is H or methyl.

6. The aqueous polymer latex of claim 5, wherein in formula (I) the variable n is an integer form 2 to 10, A is 1,2-ethanediyl and Alk is 1,2-ethanediyl.

7. The aqueous polymer latex of claim 1, wherein the monomer M3 is located predominantly on the surface or close to the surface of the polymer particles.

8. The aqueous polymer latex of claim 1, which is obtainable by a two-stage emulsion polymerisation, comprising a) a first stage, wherein monomers Ma are subjected to an emulsion polymerisation, where the monomers Ma comprise 60 to 95% of the monomers M1 comprised in the monomers M, optionally monomers M2 comprised in the monomers M and not more than 20% of the monomers M3 comprised in the monomers M;

b) a second stage b), where monomers Mb are subjected to an emulsion polymerisation in the aqueous polymer dispersion obtained in stage a), where the monomers Mb comprise the remainder of the monomers M1, M2 and M3 comprised in the monomers M.

9. The aqueous latex of claim 8, where the monomers Ma comprise at least 80% of the monomers M2 comprised in the monomers M.

10. The aqueous polymer latex of claim 1, which is obtainable by an aqueous emulsion polymerisation of monomers M in the presence of a seed latex.

11. The aqueous polymer latex of claim 10, where the amount of seed latex is in the range of 0.01 to 0.3% by weight based on the total weight of the monomers M and calculated as polymer solids.

12. The aqueous polymer latex of claim 1, wherein the particles of the copolymer contained in the polymer latex have a volume median particle diameter in the range of 270 to 400 nm, as determined by dynamic light scattering according to the ISO 13321:1996 standard.

13. The aqueous polymer latex of claim 1, which has a glass transition temperature Tg in the range from −20 to +30° C., as determined by the differential scanning calorimetry method according to ISO 11357-2:2013 with sample preparation according to ISO 16805:2003.

14. The aqueous polymer latex of claim 1, which has a minimum film forming temperature of not more than 10° C.

15. A process for producing an aqueous polymer latex of claim 1, which comprises performing an aqueous emulsion polymerisation of the monomers M.

16. A waterborne coating composition which contains a) a binder polymer in the form of the aqueous polymer latex as defined in claim 1, and b) at least one inorganic pigment and/or filler.

17. The coating composition of claim 16, which is formulated as an interior latex paint.

18. The coating composition of claim 16, which has a pigment volume concentration of at least 60%.

* * * * *